(12) United States Patent
Noguchi

(10) Patent No.: US 12,710,535 B2
(45) Date of Patent: Aug. 18, 2026

(54) OPTICAL MEASUREMENT DEVICE AND OPTICAL MEASUREMENT METHOD

(71) Applicant: NEC Corporation, Tokyo (JP)

(72) Inventor: Hidemi Noguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1025 days.

(21) Appl. No.: 17/802,998

(22) PCT Filed: Mar. 5, 2020

(86) PCT No.: PCT/JP2020/009425
§ 371 (c)(1),
(2) Date: Aug. 29, 2022

(87) PCT Pub. No.: WO2021/176652
PCT Pub. Date: Sep. 10, 2021

(65) Prior Publication Data

US 2023/0111392 A1 Apr. 13, 2023

(51) Int. Cl.
*G01S 17/58* (2006.01)
*G01S 13/58* (2006.01)
*G01S 17/894* (2020.01)

(52) U.S. Cl.
CPC ............ *G01S 17/58* (2013.01); *G01S 13/584* (2013.01); *G01S 17/894* (2020.01)

(58) Field of Classification Search
CPC ......... G01S 17/894; G01S 17/34; G01S 17/58
See application file for complete search history.

(56) References Cited

U.S. PATENT DOCUMENTS 4,715,706 A 12/1987 Wang et al.
4,721,385 A * 1/1988 Jelalian .................. G01S 17/42 356/28.5
6,097,329 A 8/2000 Wakayama
(Continued)

FOREIGN PATENT DOCUMENTS

JP S63-111489 A 5/1988
JP H11-183616 A 7/1999
(Continued)

OTHER PUBLICATIONS

RP Photonics, "Instantaneous frequency" accessed from "rp-photonics.com/instantaneous_frequency.html" with Wayback Machine dated Oct. 18, 2006. (Year: 2006).*
(Continued)

*Primary Examiner* — Yuqing Xiao
*Assistant Examiner* — Zhengqing Qi

(57) ABSTRACT

An optical measurement device (10) according to the present disclosure includes a light-transmitting unit (11) that transmits ranging light for Time of Flight (ToF) ranging, a light-receiving unit (12) that receives reflection light reflected from a measurement object by the ranging light transmitted by the light-transmitting unit (11), a Doppler shift amount calculation unit (13) that calculates a Doppler shift amount of a frequency of the reflection light, based on a phase change amount of the reflection light received by the light-receiving unit (12), and a relative speed calculation unit (14) that calculates a relative speed of the measurement object, based on the Doppler shift amount calculated by the Doppler shift amount calculation unit (13).

12 Claims, 33 Drawing Sheets

(56) References Cited

U.S. PATENT DOCUMENTS

| | | | | |
|---|---|---|---|---|
| 2007/0215795 | A1* | 9/2007 | Kameyama | G01S 7/491 250/222.2 |
| 2011/0174078 | A1 | 7/2011 | Chinn et al. | |
| 2014/0233013 | A1* | 8/2014 | Sakimura | G01S 7/4815 356/5.01 |
| 2016/0291135 | A1* | 10/2016 | Ando | G01S 7/4811 |
| 2019/0293794 | A1* | 9/2019 | Zhang | G01S 7/4817 |
| 2020/0033449 | A1* | 1/2020 | Schwarz | G01S 7/4865 |
| 2020/0132850 | A1* | 4/2020 | Crouch | G01S 7/4817 |
| 2020/0408908 | A1* | 12/2020 | Donovan | G01S 7/4816 |
| 2021/0018626 | A1 | 1/2021 | Noguchi | |
| 2021/0181321 | A1* | 6/2021 | Huang | G01S 7/4917 |
| 2021/0293960 | A1* | 9/2021 | Kreitinger | G01S 7/4815 |

FOREIGN PATENT DOCUMENTS

| | | | |
|---|---|---|---|
| JP | 2005-010130 | A | 1/2005 |
| JP | 2006-281979 | A | 10/2006 |
| JP | 2010-091490 | A | 4/2010 |
| JP | 2013-190349 | A | 9/2013 |
| JP | 2014-142182 | A | 8/2014 |
| JP | 2019-045200 | A | 3/2019 |
| JP | 2019-074424 | A | 5/2019 |
| JP | 2019-512692 | A | 5/2019 |
| WO | 2015/087380 | A1 | 6/2015 |
| WO | 2015/189915 | A1 | 12/2015 |
| WO | 2017/077612 | A1 | 5/2017 |
| WO | 2019/186776 | A1 | 10/2019 |

OTHER PUBLICATIONS

International Search Report for PCT Application No. PCT/JP2020/009425, mailed on Jun. 9, 2020.

JP Office Action for JP Application No. 2022-504884, mailed on Jun. 13, 2023 with English Translation.

Japanese Office Communication for JP Application No. 2022-504884 mailed on Mar. 12, 2024 with English Translation.

* cited by examiner

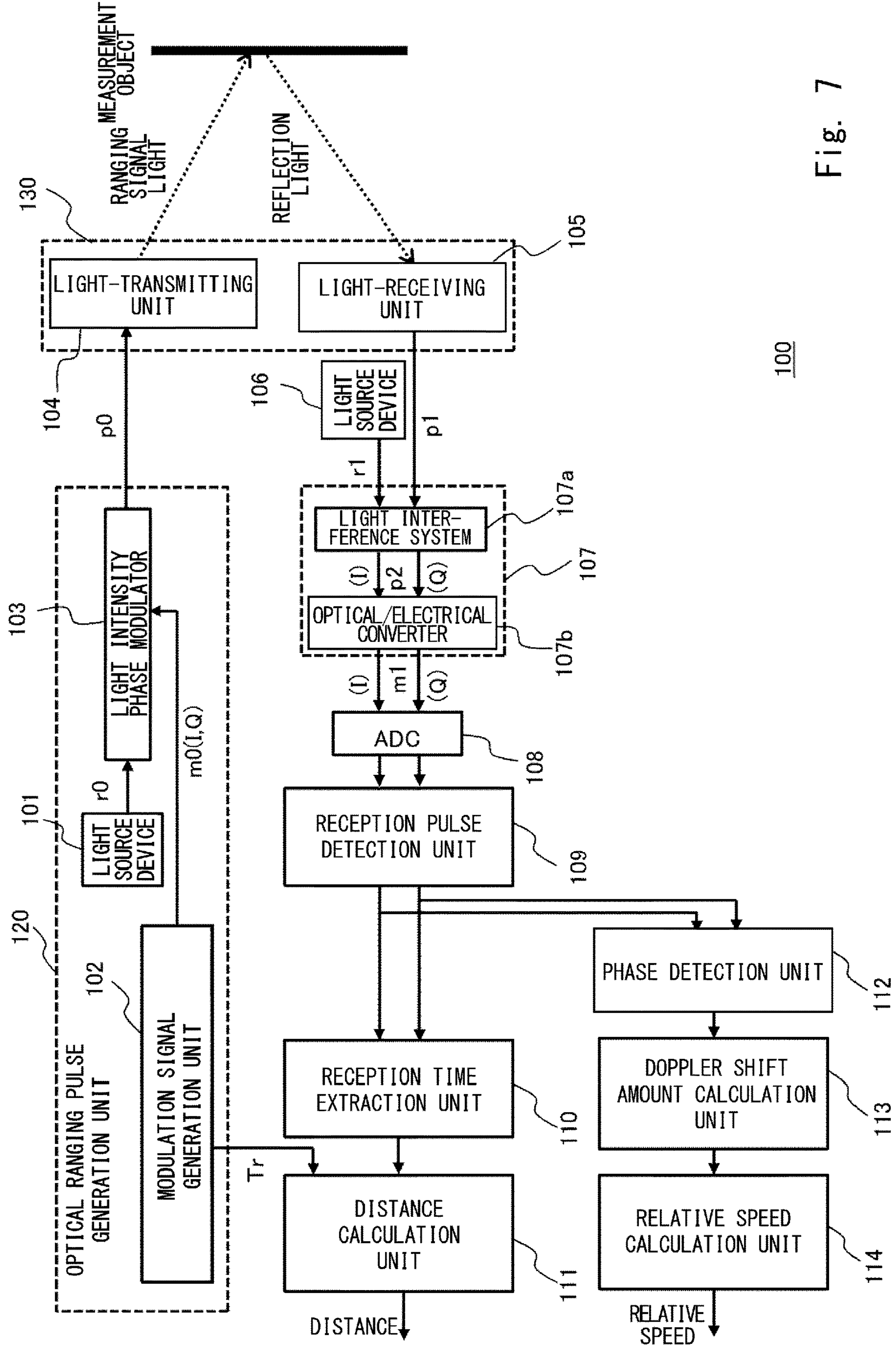
MEASUREMENT OBJECT
RANGING SIGNAL LIGHT
REFLECTION LIGHT
130
105
LIGHT-TRANSMITTING UNIT
LIGHT-RECEIVING UNIT
104
p0
106
LIGHT SOURCE DEVICE
p1
r1
107a
LIGHT INTER-FERENCE SYSTEM
(I)
p2
(Q)
107
103
LIGHT INTENSITY PHASE MODULATOR
OPTICAL/ELECTRICAL CONVERTER
107b
m1
m0(I,Q)
ADC
108
r0
101
LIGHT SOURCE DEVICE
RECEPTION PULSE DETECTION UNIT
109
120
PHASE DETECTION UNIT
112
102
OPTICAL RANGING PULSE GENERATION UNIT
MODULATION SIGNAL GENERATION UNIT
RECEPTION TIME EXTRACTION UNIT
110
DOPPLER SHIFT AMOUNT CALCULATION UNIT
113
Tr
DISTANCE CALCULATION UNIT
111
RELATIVE SPEED CALCULATION UNIT
114
DISTANCE
RELATIVE SPEED
100
Fig. 7

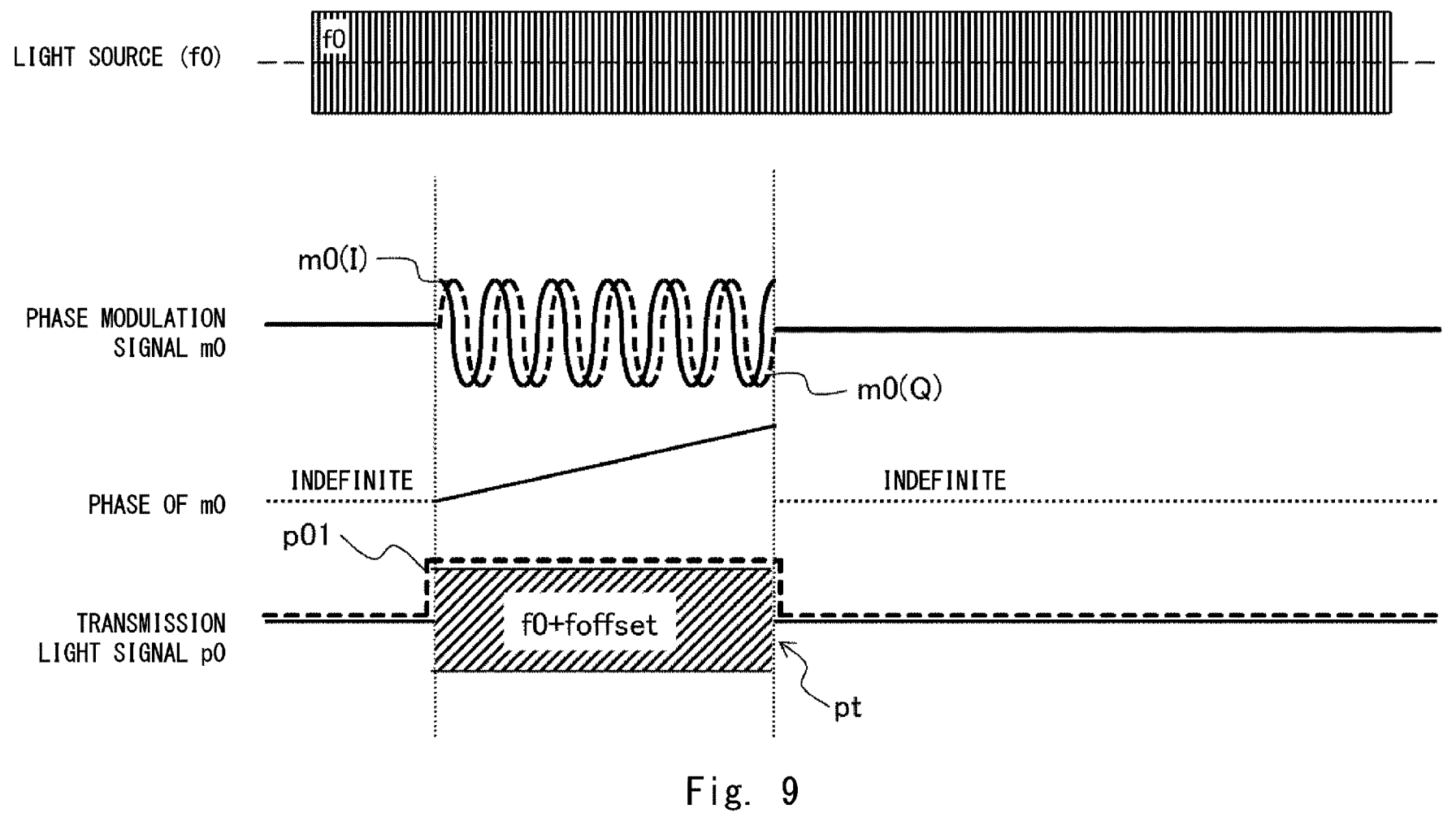

LIGHT SOURCE (f0)
f0
PHASE MODULATION SIGNAL m0
m0(I)
m0(Q)
PHASE OF m0
INDEFINITE
INDEFINITE
TRANSMISSION LIGHT SIGNAL p0
p01
f0+foffset
pt

Fig. 9

PHASE VECTOR OF (+foffset)

Figure 12:
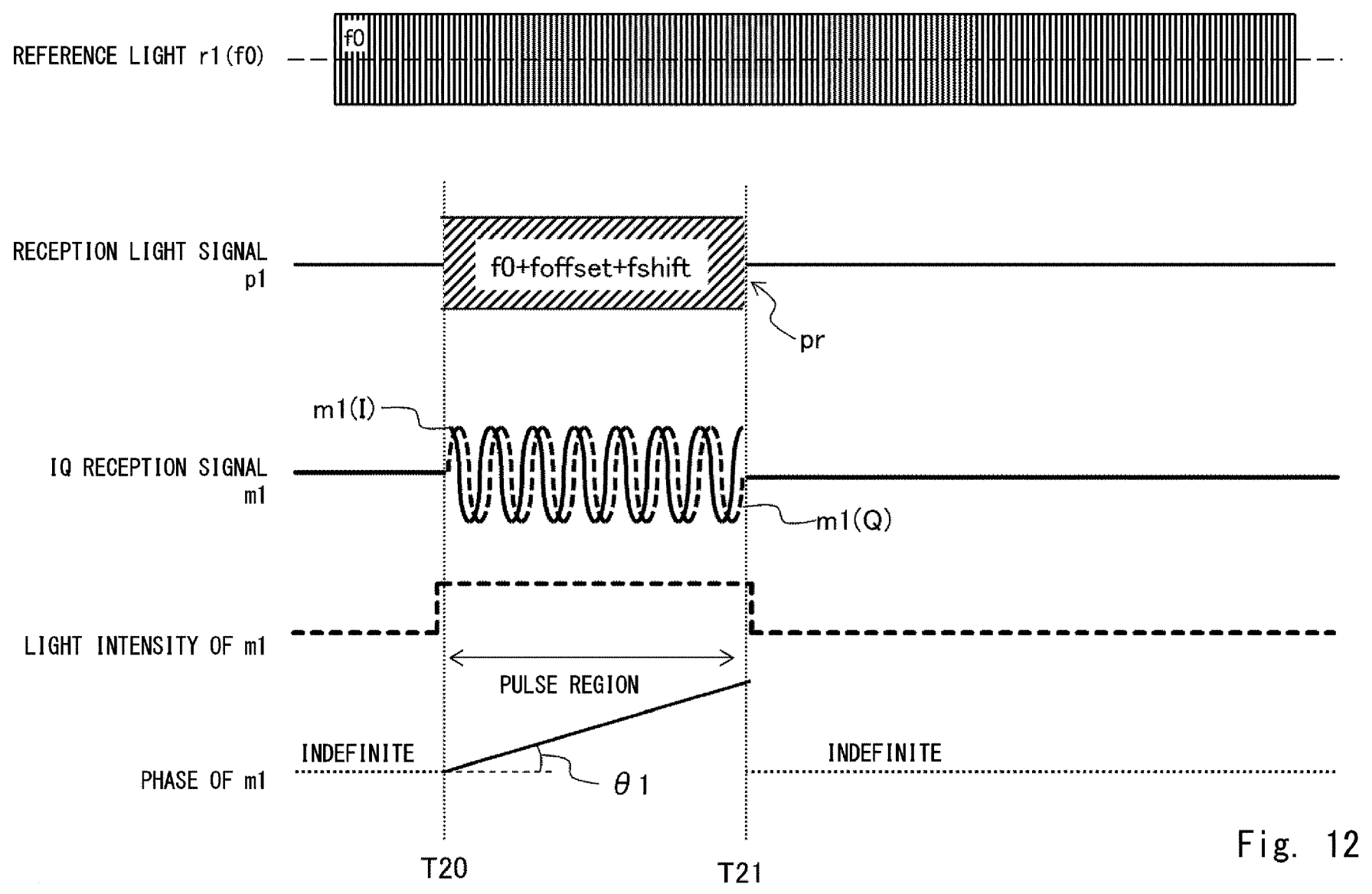

REFERENCE LIGHT r1 (f0)

f0

RECEPTION LIGHT SIGNAL p1 f0+foffset+fshift pr

IQ RECEPTION SIGNAL m1 m1(I)

m1(Q)

LIGHT INTENSITY OF m1

PULSE REGION

PHASE OF m1

INDEFINITE

θ1

INDEFINITE

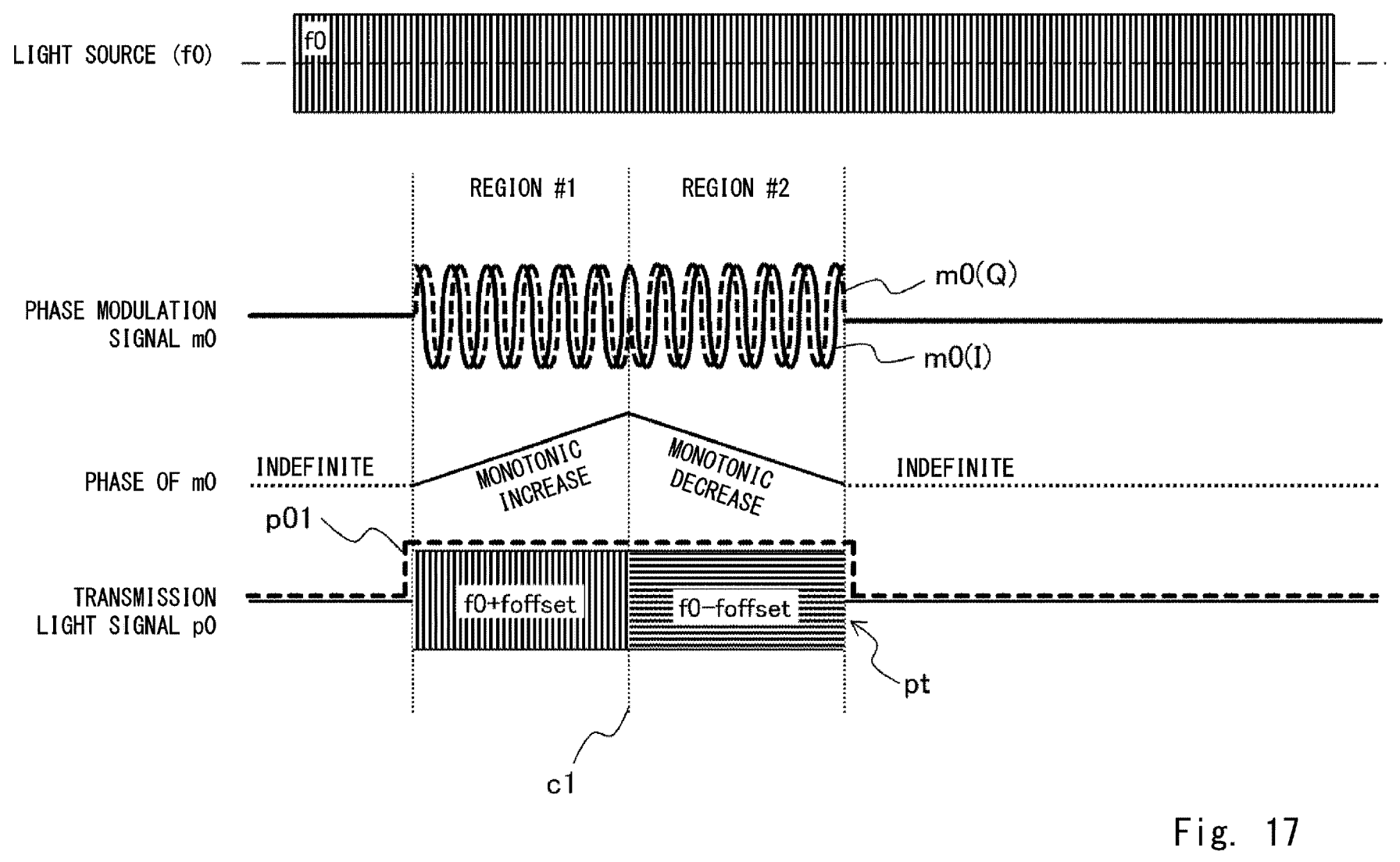

LIGHT SOURCE (f0)

f0

PHASE MODULATION SIGNAL m0 m0(Q)

m0(I)

REGION #1

REGION #2

PHASE OF m0

INDEFINITE

MONOTONIC INCREASE

MONOTONIC DECREASE

INDEFINITE

TRANSMISSION LIGHT SIGNAL p0 p01 f0+foffset f0−foffset pt c1

Fig. 17

REGION #1
REGION #2
pr
IQ RECEPTION SIGNAL m1
m1(I)
m1(Q)
LIGHT INTENSITY OF m1
PULSE REGION
PHASE OF m1
INDEFINITE
θ10
θ20
INDEFINITE
T20
c2
T21

Fig. 20

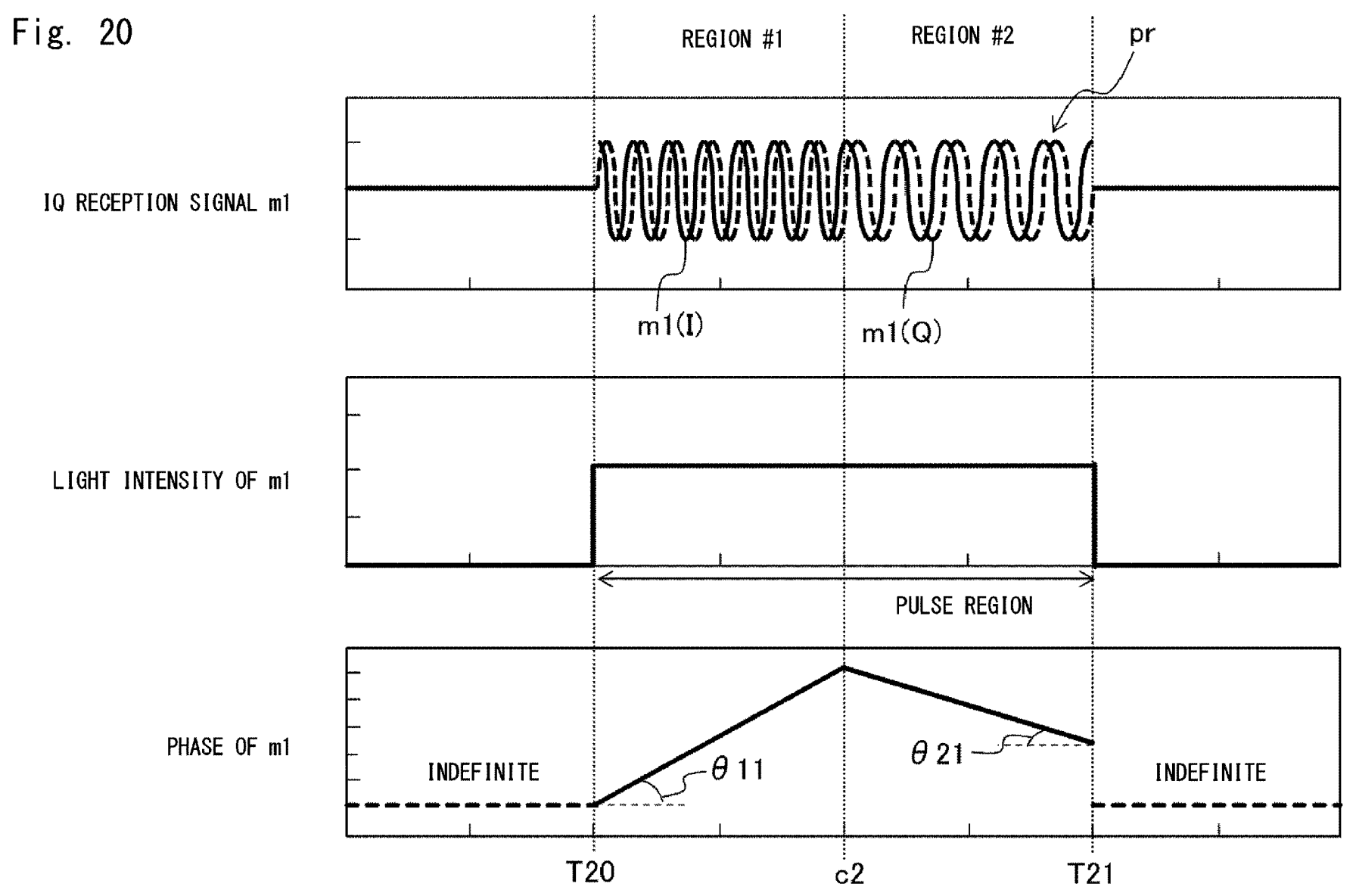

IQ RECEPTION SIGNAL m1

LIGHT INTENSITY OF m1

PHASE OF m1

REGION #1

REGION #2 pr m1(I)

m1(Q)

PULSE REGION

INDEFINITE

INDEFINITE

θ11

θ21

T20 c2

T21

OPTICAL MEASUREMENT DEVICE AND OPTICAL MEASUREMENT METHOD

This application is a National Stage Entry of PCT/JP2020/009425 filed on Mar. 5, 2020, the contents of all of which are incorporated herein by reference, in their entirety.

TECHNICAL FIELD

The present invention relates to an optical measurement device and an optical measurement method.

BACKGROUND ART

An optical measurement device (also called Light Detection and Ranging (LiDAR)) that measures a distance to an object by using light is known. The optical measurement device generally employs a Time of Flight (ToF) ranging system. The ToF ranging system is a system of measuring a distance to an object, based on a time after transmission of a light pulse until reception of a reflected pulse reflected from the object.

Since such an optical measurement device can acquire distances of a wide range of objects from a remote place, the optical measurement device is used for diagnosis and prediction of deterioration of infrastructure equipment by measurement of distortion of bridges and the like, disaster prevention measures and disaster prediction by measurement of distortion of slopes of mountains and the like. Further, since the optical measurement device can detect and identify obstacles and suspicious objects over a wide range even in the dark, the optical measurement device is also used for security and monitoring such as airport monitoring. In addition, the optical measurement device is also beginning to attract attention as a sensor for automatic operation.

Meanwhile, it is known that a measurement device such as a radar device can measure a relative speed of an object as well as a distance to the object (e.g., refer to Patent Literatures 1 to 3).

CITATION LIST

Patent Literature

[Patent Literature 1] Japanese Unexamined Patent Application Publication No. 2019-074424

[Patent Literature 2] Japanese Unexamined Patent Application Publication No. 2010-091490

[Patent Literature 3] Japanese Unexamined Patent Application Publication No. 2006-281979

SUMMARY OF INVENTION

Technical Problem

As in Patent Literatures 1 to 3, it is recognized in the related art that a measurement device such as a radar device can measure a relative speed of an object. However, the related art does not consider measuring a relative speed of an object by using ranging light for ToF ranging, and therefore, there is a problem that it may be difficult to measure the relative velocity of the object.

In view of such a problem, an object of the present disclosure is to provide an optical measurement device and an optical measurement method that are capable of measuring a relative speed of an object by using ranging light for ToF ranging.

Solution to Problem

An optical measurement device according to the present disclosure includes: a light-transmitting means for transmitting ranging light for Time of Flight (ToF) ranging; a light-receiving means for receiving reflection light that is reflected from a measurement object by the transmitted ranging light; a Doppler shift amount calculation means for calculating a Doppler shift amount of a frequency of the reflection light, based on a phase change amount of the received reflection light; and a relative speed calculation means for calculating a relative speed of the measurement object, based on the calculated Doppler shift amount.

An optical measurement method according to the present disclosure includes: transmitting ranging light for Time of Flight (ToF) ranging; receiving reflection light that is reflected from a measurement object by the transmitted ranging light; calculating a Doppler shift amount of a frequency of the reflection light, based on a phase change amount of the received reflection light; and calculating a relative speed of the measurement object, based on the calculated Doppler shift amount.

Advantageous Effects of Invention

According to the present disclosure, it is possible to provide an optical measurement device and an optical measurement method that are capable of measuring a relative speed of an object by using ranging light for ToF ranging.

BRIEF DESCRIPTION OF DRAWINGS

FIG. 7 is a configuration diagram illustrating a configuration example of an optical measurement device according to the first example embodiment;

FIG. 9 is a timing chart illustrating a transmission signal according to the first example embodiment;

FIG. 12 is a timing chart illustrating a reception signal according to the first example embodiment;

FIG. 17 is a timing chart illustrating a transmission signal according to the second example embodiment;

FIG. 20 is a timing chart illustrating a reception signal according to the second example embodiment;

EXAMPLE EMBODIMENT

Figure 1:
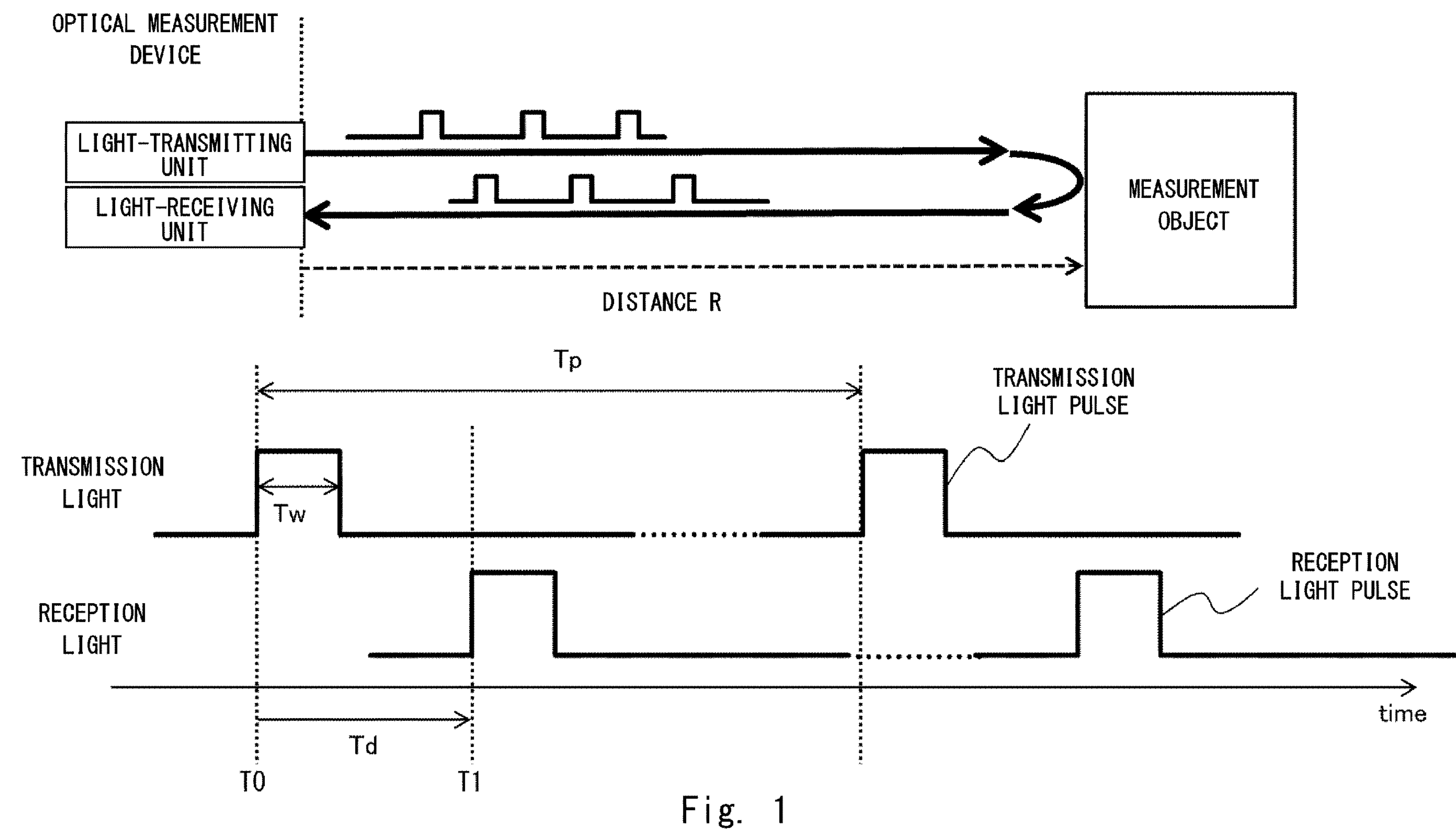
FIG. 1 is a diagram for explaining a ranging principle of a ToF system.

Example embodiments will be explained below with reference to the drawings. In the drawings, the same elements are denoted by the same reference numerals, and a repetitive description thereof is omitted as necessary. Note that arrows attached to each configuration diagram (block diagram) are illustrative examples and do not limit types or directions of signals.

Examination of Example Embodiments

FIG. 1 illustrates a ranging principle of a ToF ranging system. As illustrated in FIG. 1, in the ToF ranging system, an optical measurement device transmits ranging light including a transmission light pulse, receives reflection light reflected from a measurement object, and measures a distance R from the optical measurement device to the measurement object, based on a transmission time of the transmission light pulse and an arrival time (reception time) of a reception light pulse included in the reflection light.

As illustrated in FIG. 1, the optical measurement device transmits a transmission light pulse having a pulse width Tw in a pulse period Tp, for example. The pulse period and the pulse width are set according to a measurement application, performance of the optical measurement device, and the like. For example, the pulse width Tw is several tens ns. Assuming that a return delay time from a rising time T0 of the transmission light pulse to a rising time T1 of the reception light pulse is Td, the distance R is acquired by the following equation (1). Herein, C is a speed of light, and the return delay time Td is a delay time of about 6.6 ns/m.

[Equation 1]

$$R = \frac{CT_d}{2} \tag{1}$$

Although a light intensity of the reception light pulse (reception light signal) and that of the transmission light pulse (transmission light signal) are illustrated to be approximately the same for easy understanding, in an actual measurement environment, the intensity of the reception light pulse is attenuated to a greater extent than the intensity of the transmission light pulse. The same applies to the following drawings.

As described above, in the optical measurement device, the distance to the measurement object can be measured by employing the ToF ranging system. Further, in the optical measurement device, by measuring a distance of each measurement point included in a predetermined measurement range (scan range) by the ToF ranging system, it is possible to generate three-dimensional point cloud data including the distance of each measurement point, and to acquire a three-dimensional structure of the measurement object within the measurement range.

However, since the ToF ranging system is basically a system for measuring the distance, it is difficult to directly acquire information other than distance information, in particular, a relative speed. Therefore, the inventor has examined a method of measuring a relative speed of the measurement object together with the distance to the measurement object in the optical measurement device of the ToF ranging system.

As a result of the examination, the inventor has found that the following merits can be acquired by acquiring relative speed information of the measurement object. Namely, when whether or not the measurement object is stationary (or moving) can be detected, it is usable for various applications. For example, relative speed information can be used for speed detecting applications such as speed violation automatic regulating device that automatically regulates vehicle speed violations. Further, by extracting only point cloud data of moving measurement points from point cloud data of a measurement range, the relative speed information can be used for intruder detection. Further, by excluding moving point cloud data such as a person or a car from the point cloud data of the measurement range and extracting detailed point cloud data of only a stationary object, the relative speed information can be used when removing extra data in an infrastructure inspection or the like.

Further, as a result of the examination, the inventor has found that the following problem occurs when the relative speed information is simply acquired by using the ToF ranging system. Accordingly, as a simple method, a method of performing ToF ranging a plurality of times and acquiring a relative speed from the plurality of measurement results is considered. Specifically, the relative speed is acquired from variation of distance information that is measured at a plurality of timings. Then, since the relative speed information cannot be acquired by one ranging operation, it takes time to acquire the relative speed. In addition, in order to acquire relative speeds of all the measurement points with respect to point cloud data including a plurality of pieces of distance information, a high-speed ranging operation is required. Note that a method of acquiring a relative speed by repeating scanning using a plurality of (16 or 32) scanning beams by an automatic operation LiDAR or the like is also conceivable, but the desired distance information and relative speed information cannot be acquired because a point cloud density is rough and distance accuracy is poor.

Therefore, in the following example embodiments, it is possible to measure the distance to the measurement object and the relative speed of the measurement object at a time in the optical measurement device of the ToF ranging system.

Outline of Example Embodiments

Figure 2:
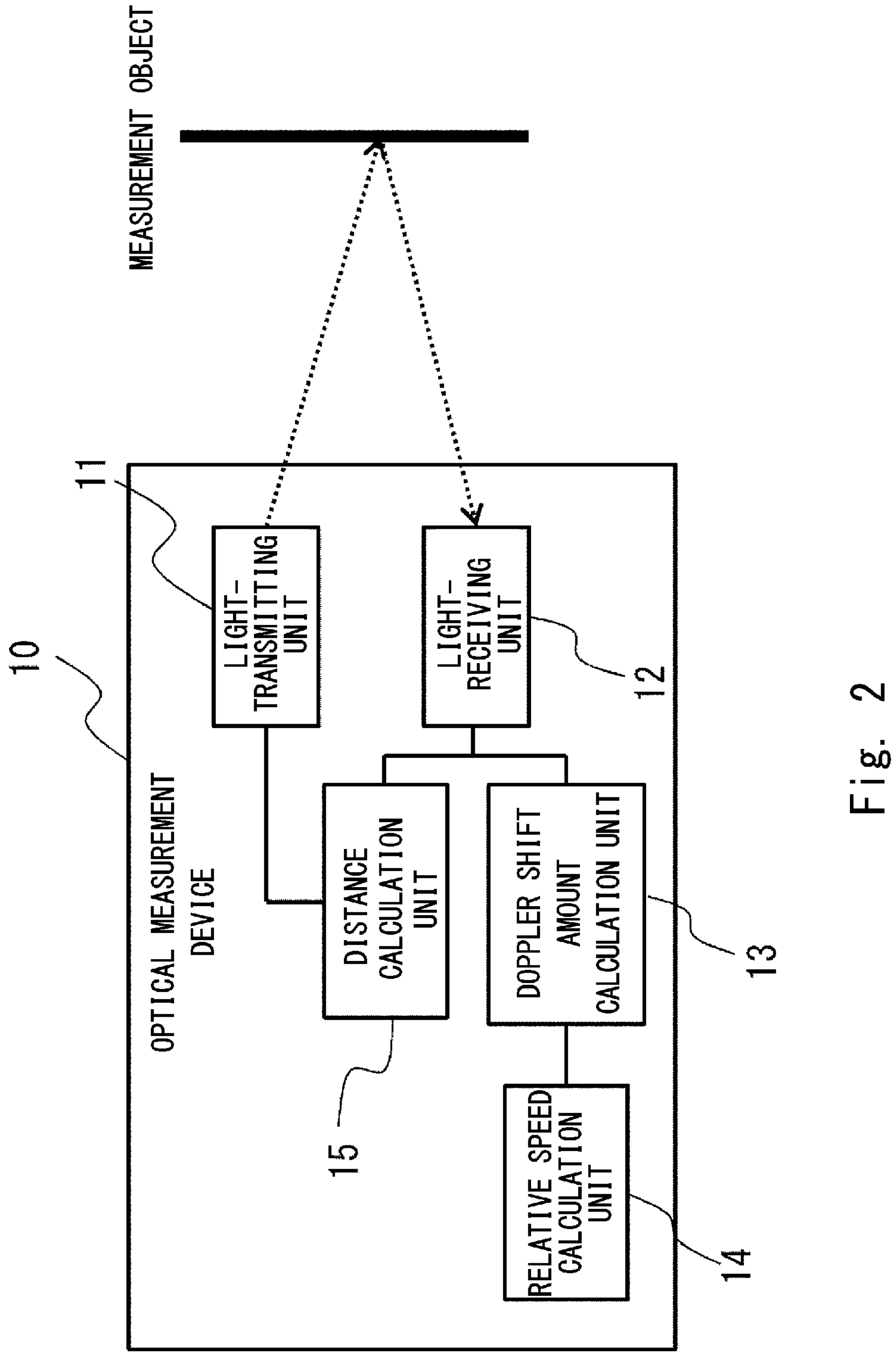
FIG. 2 is a configuration diagram illustrating an outline of an optical measurement device according to an example embodiment.
Figure 3:
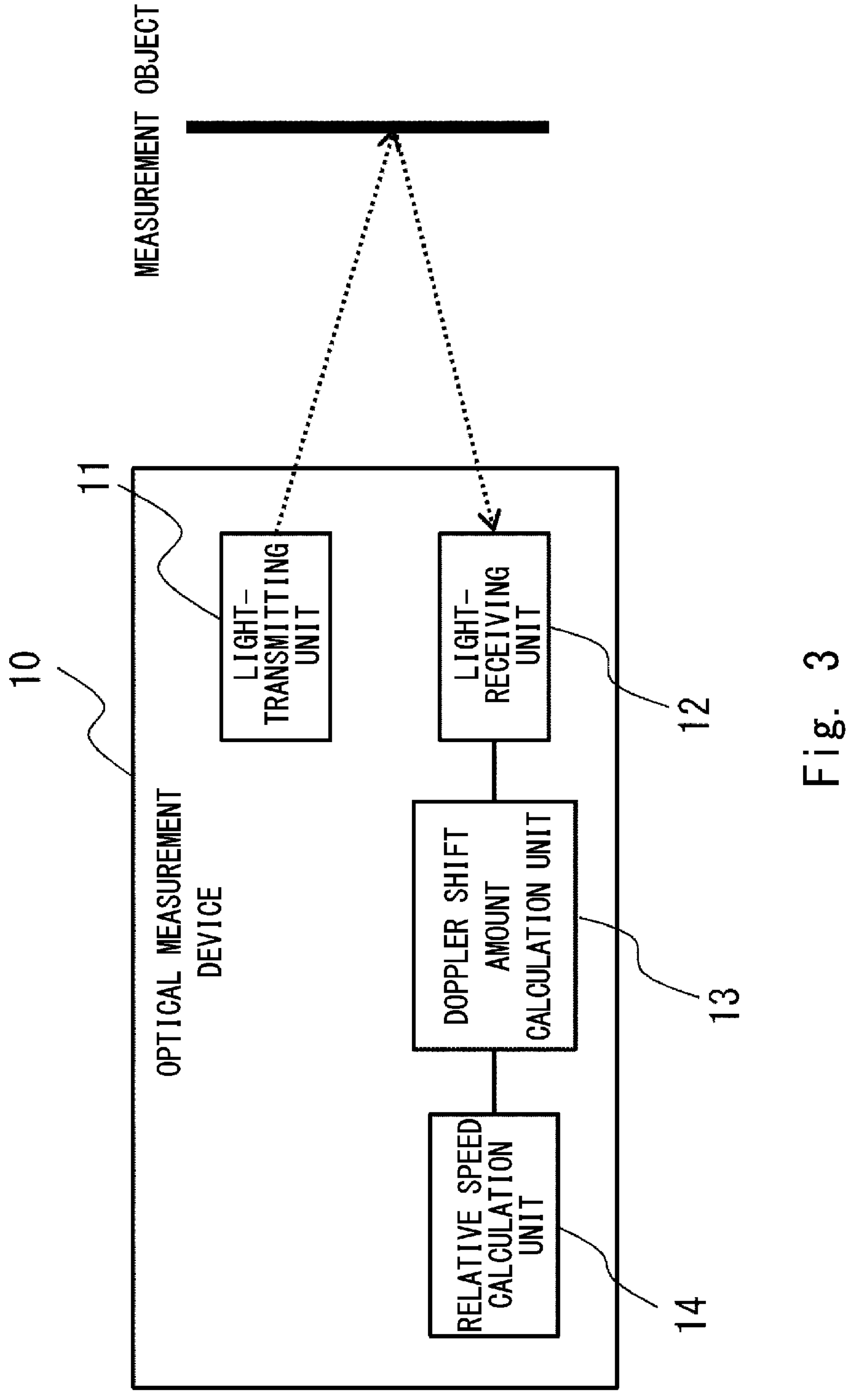
FIG. 3 is a configuration diagram illustrating an outline of the optical measurement device according to the example embodiment.

FIGS. 2 and 3 each illustrate an outline of an optical measurement device according to an example embodiment. As illustrated in FIG. 2, an optical measurement device 10 according to the example embodiment includes a light-transmitting unit 11, a light-receiving unit 12, a Doppler shift amount calculation unit 13, a relative speed calculation unit 14, and a distance calculation unit 15. As illustrated in FIG. 3, the optical measurement device 10 may include only the light-transmitting unit 11, the light-receiving unit 12, the Doppler shift amount calculation unit 13, and the relative speed calculation unit 14.

The light-transmitting unit 11 transmits ranging light including a light pulse (transmission light pulse) for ToF ranging. The light-receiving unit 12 receives reflection light that is reflected from a measurement object by the ranging light transmitted by the light-transmitting unit 11. The Doppler shift amount calculation unit 13 calculates a Doppler shift amount of a light pulse (reception light pulse) included in the reflection light received by the light-receiving unit 12, based on a frequency of the light pulse. For example, the Doppler shift amount is calculated based on a phase change amount of the reception light pulse (reflection light).

The relative speed calculation unit 14 calculates a relative speed of the measurement object, based on the Doppler shift amount calculated by the Doppler shift amount calculation unit 13. The distance calculation unit 15 calculates a distance from the optical measurement device 10 to the measurement target, based on a time difference between the light pulse transmitted by the light-transmitting unit 11 and the light pulse received by the light-receiving unit 12.

Figure 4:
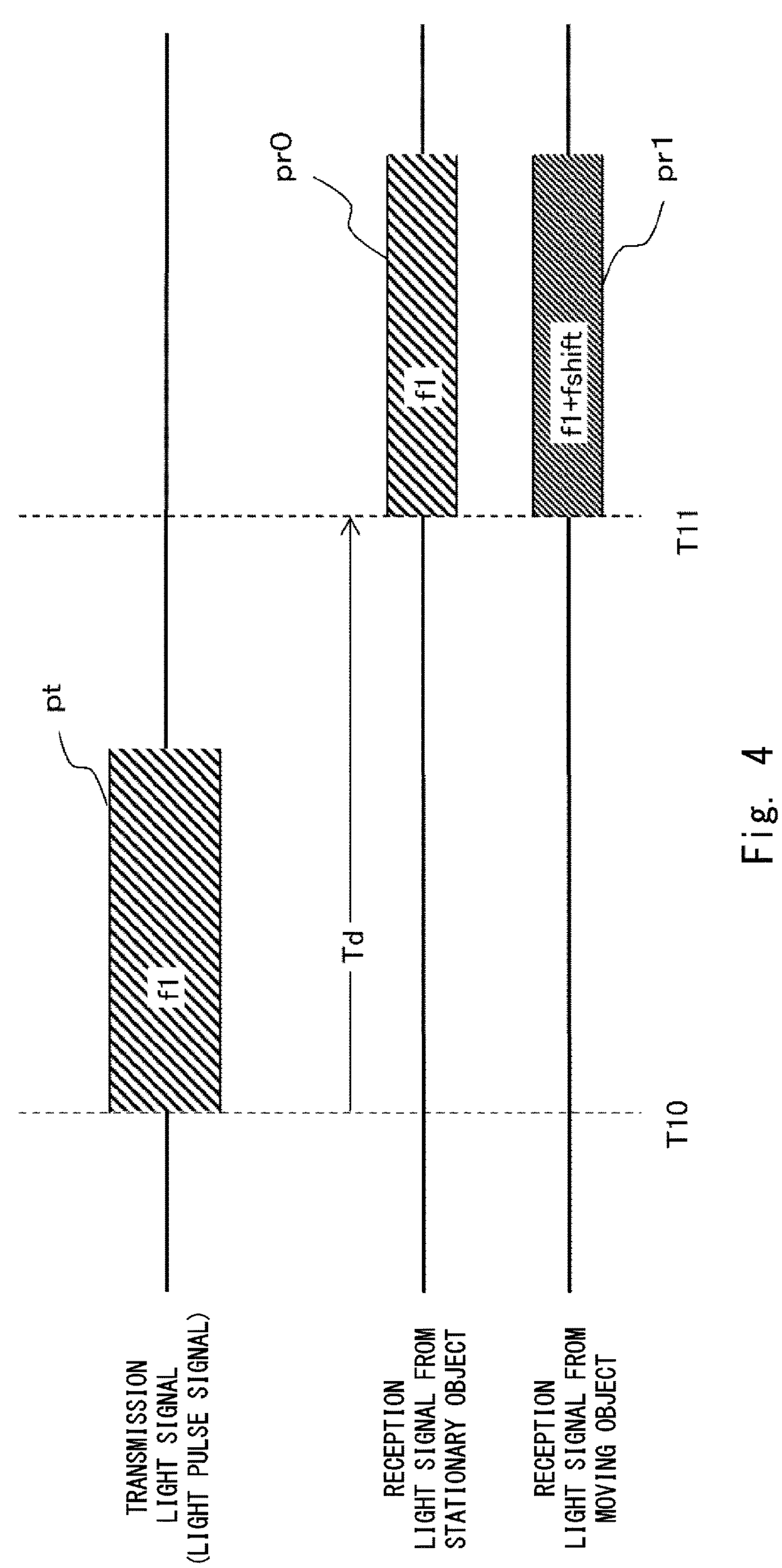
FIG. 4 is a timing chart for explaining an outline of an optical measurement method according to the example embodiment.

FIG. 4 illustrates a transmission light signal and a reception light signal in the optical measurement device 10. Note that FIG. 4 schematically illustrates an optical signal of each optical frequency for simplification, and the same applies to the following drawings. As illustrated in FIG. 4, the optical measurement device 10 transmits a transmission light pulse pt having an optical frequency f1. For example, f1=f0+foffset where f0 is a frequency of a transmission light source (reference light) and foffset is a frequency offset. As illustrated in FIG. 4, the optical measurement device 10 receives a reception light pulse pr0 having the same optical frequency f1 as the transmission light pulse pt when the measurement object is a stationary object, and receives a reception light pulse pr1 having an optical frequency (f1+fshift) shifted by a Doppler shift amount (Doppler shift frequency fshift) from the optical frequency f1 of the transmission light pulse pt when the measurement object is a moving object.

Therefore, in the example embodiment, a relative speed of the measurement object is calculated by acquiring a Doppler shift amount of the reception light pulse (reception light signal). The Doppler shift amount (fshift) can be represented by the following equation (2) when the measurement object approaches the optical measurement device, and can be represented by the following equation (3) when the measurement object moves away from the optical measurement device. From these equations, the relative speed can be acquired based on the Doppler shift amount. Note that C is a speed of light, and v is a relative speed.

[Equation 2]

$$f_{shift} = \frac{C+v}{C} f_1 \tag{2}$$

[Equation 3]

$$f_{shift} = \frac{C-v}{C} f_1 \tag{3}$$

The distance to the measurement object is acquired by, for example, a return delay time Td from a time T10 at which the transmission light pulse pt is transmitted to a time T11 at which the reception light pulse pr0 or pr1 is received. Note that the times T10 and T11 serving as a reference for acquiring the distance are not limited to heads of the transmission light pulse and the reception light pulse (light signals).

In this manner, by transmitting the ranging light including the light pulse for ToF ranging and acquiring the Doppler shift amount of the frequency of the light pulse included in the received reflection light, the relative speed of the measurement object can be acquired. Since the light pulse for ToF ranging is used, the relative speed of the measurement object can be acquired together with the distance to the measurement object. Further, the measurement accuracy can be improved by acquiring the Doppler shift amount, based on the phase change amount of the received light pulse.

First Example Embodiment

Hereinafter, a first example embodiment will be explained with reference to the drawings. In the present example embodiment, in the optical measurement device of the ToF ranging system, a phase of a reception light pulse is detected by optical heterodyne detection, and the Doppler shift amount is calculated from the detected phase change amount.

Figure 5:
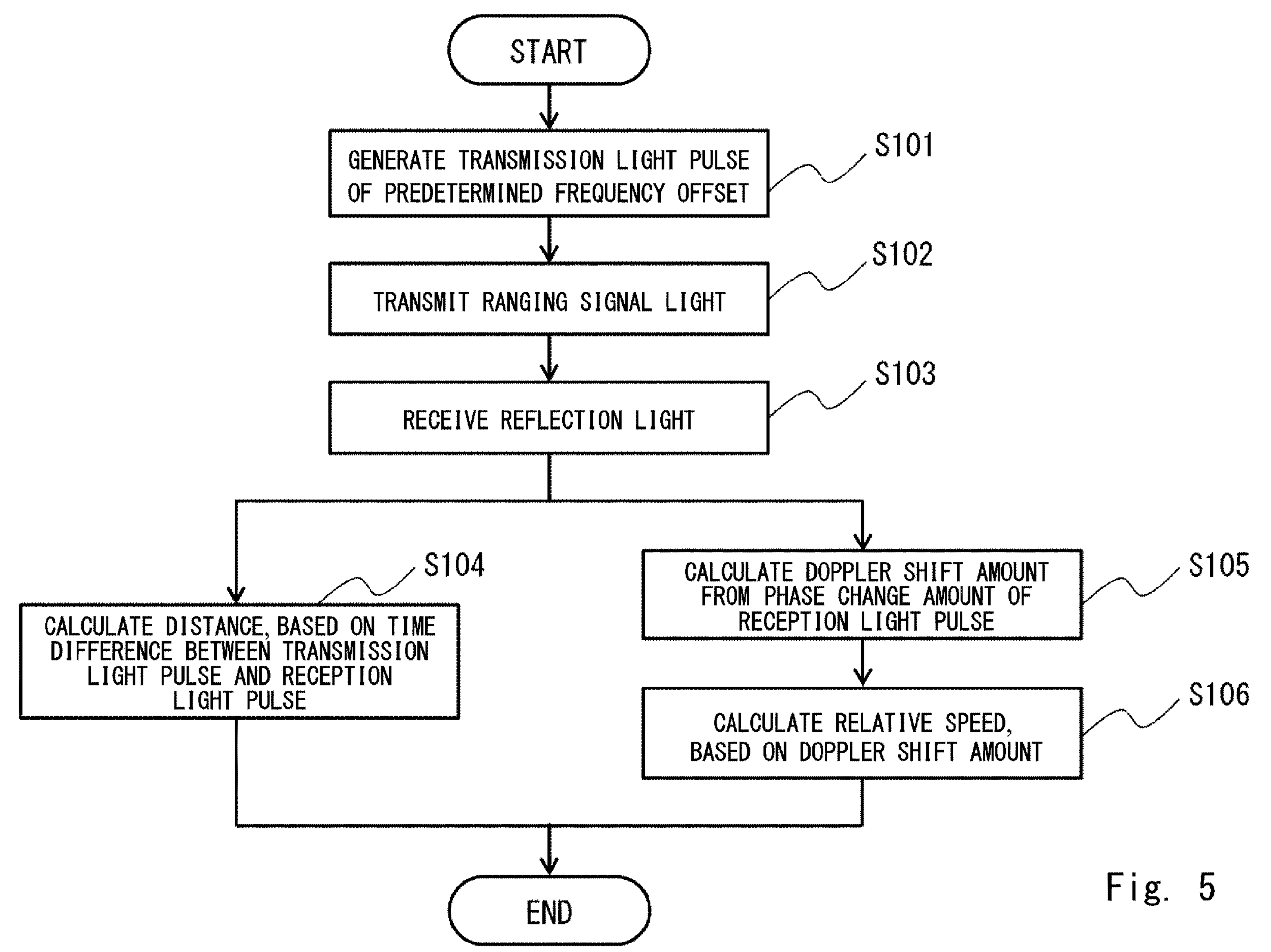
FIG. 5 is a flowchart illustrating an optical measurement method according to a first example embodiment.
Figure 6:
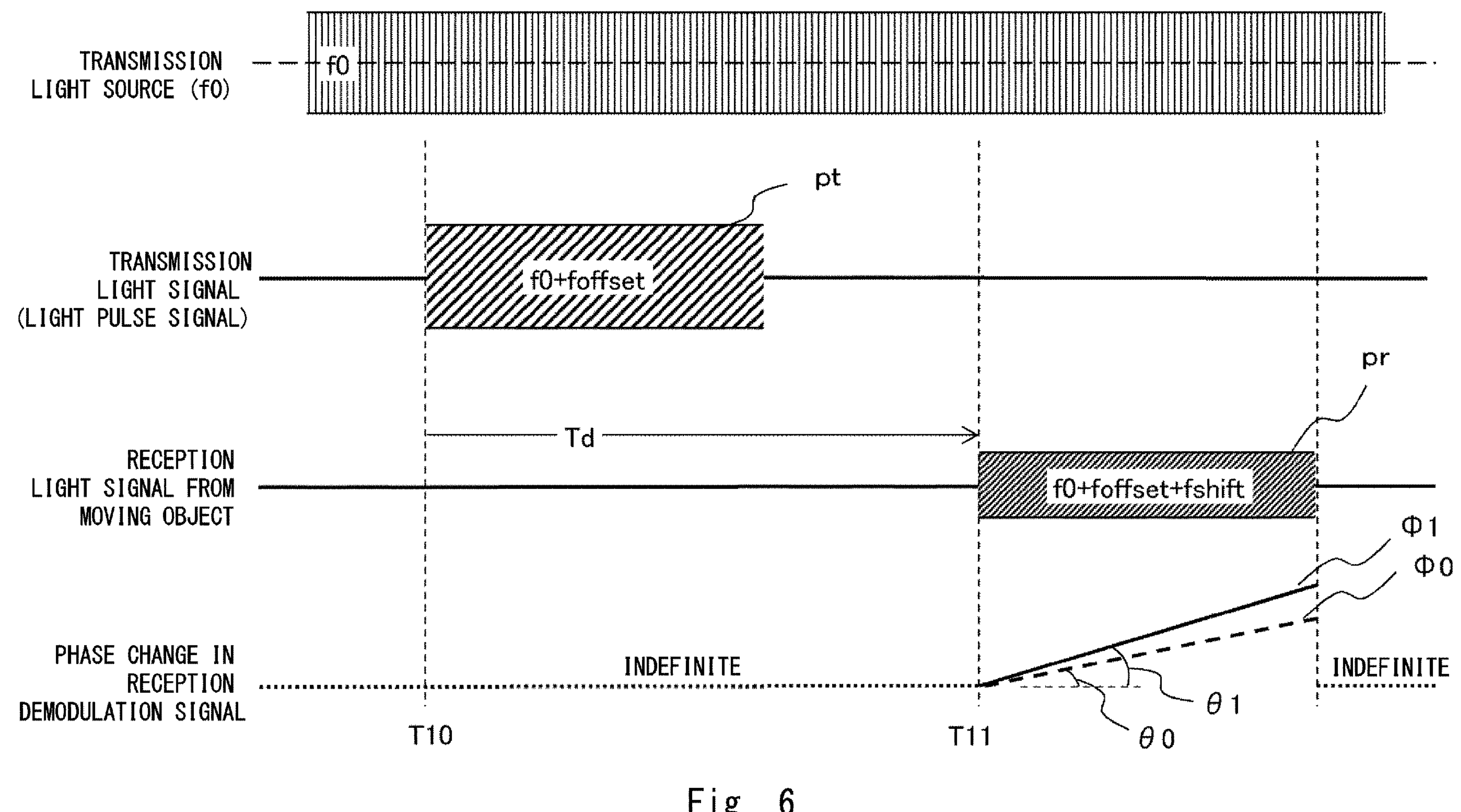
FIG. 6 is a timing chart illustrating the optical measurement method according to the first example embodiment.

FIGS. 5 and 6 illustrate an optical measurement method according to the present example embodiment. As illustrated in FIG. 5, in the present example embodiment, a transmission light pulse having a predetermined frequency offset is generated on a transmission side of the optical measurement device (S101), and the generated transmission light pulse is transmitted as ranging signal light (S102). As illustrated in FIG. 6, a transmission light pulse pt having an optical frequency (f0+foffset) is generated by applying modulation (phase modulation) to a light signal of a transmission light source (reference light source) of a frequency f0 such that a predetermined positive frequency offset foffset is added thereto. The frequency offset foffset is not particularly limited, but is, for example, 100 MHz to 200 MHz.

Next, as illustrated in FIG. 5, on a reception side of the optical measurement device, reflection light from the measurement object is received (S103), and the distance of the measurement object is calculated based on a time difference between the transmission light pulse and the reception light pulse (S104). As illustrated in FIG. 6, the distance of the measurement object is acquired from the return delay time Td from a time T10 at which the transmission light pulse pt is transmitted to a time T11 at which the reception light pulse pr is received.

As illustrated in FIG. 5, on the reception side of the optical measurement device, the Doppler shift amount is calculated from the phase change amount of the reception light pulse (S105), and the relative speed of the measurement object is calculated based on the calculated Doppler shift amount (S106). As illustrated in FIG. 6, similarly to FIG. 4, when the measurement object is a moving object, a reception light pulse pr having an optical frequency (f0+foffset+fshift), which is shifted by a Doppler shift frequency fshift from the transmission light pulse pt, is received. A phase of the reception light pulse pr monotonously increases according to its frequency. Therefore, an inclination θ0 of a phase Φ0 in a case where the measurement object is a stationary object and an inclination θ1 of a phase Φ1 in a case where the measurement object is a moving object are different from each other. Since an inclination of phase increase means a frequency (angular frequency), the inclination θ1 of the phase Φ1 of the reception light pulse received from the moving object has a steeper inclination of increase by the Doppler shift than the inclination θ0 of the phase Φ0 of the reception light pulse received from the stationary object. Specifically, the inclination θ0=2π× foffset when there is no Doppler shift, and the inclination θ1=2π×(foffset+fshift) when there is a Doppler shift. In the present example embodiment, the Doppler shift amount (fshift) is acquired from this difference of inclination.

FIG. 7 illustrates a configuration of the optical measurement device according to the present example embodiment. Note that the configuration of FIG. 7 is one example, and any other configuration may be used as long as the optical ranging method according to the present example embodiment can be executed. For example, other coherent light transmitting/receiving devices may be used.

As illustrated in FIG. 7, an optical measurement device 100 according to the present example embodiment includes a light source device 101, a modulation signal generation unit 102, a light intensity phase modulator 103, a light-transmitting unit 104, a light-receiving unit 105, a light source device 106, a coherent IQ optical receiver 107, an ADC 108, a reception pulse detection unit 109, a reception time extraction unit 110, a distance calculation unit 111, a phase detection unit 112, a Doppler shift amount calculation unit 113, and a relative speed calculation unit 114.

For example, the light source device 101, the modulation signal generation unit 102, and the light intensity phase modulator 103 constitute an optical ranging pulse generation unit (light pulse generation unit) 120 that generates a light pulse. The optical ranging pulse generation unit 120 and the light-transmitting unit 104 constitute a transmission unit (transmission side) of the optical measurement device 100, and the light-receiving unit 105, the light source device 106, the coherent IQ optical receiver 107, the ADC 108, the reception pulse detection unit 109, the reception time extraction unit 110, the distance calculation unit 111, the phase detection unit 112, the Doppler shift amount calculation unit 113, and the relative speed calculation unit 114 constitute a reception unit (reception side) of the optical measurement device 100.

The light source device 101 is a light source device, such as a laser, that generates a light source r0 (e.g., a frequency f0) for generating a transmission light pulse. The modulation signal generation unit 102 generates a phase modulation signal m0 for modulating a monotonically increasing phase of a transmission light pulse. The modulation signal generation unit 102 outputs a transmission trigger signal Tr at a timing of generating (modulating) a transmission light pulse.

The light intensity phase modulator 103 generates a transmission light pulse acquired by applying intensity modulation and phase modulation to the light source r0, based on the phase modulation signal m0, and outputs a transmission light signal p0 including the transmission light pulse. In this example, the light intensity phase modulator 103 applies monotonically increasing phase modulation to the light source r0, based on a phase modulation signal m0 (I, Q), thereby generating a transmission light pulse having a predetermined frequency offset. The light intensity phase modulator 103 is, for example, a Mach-Zehnder (MZ) type IQ optical modulator.

Figure 8:
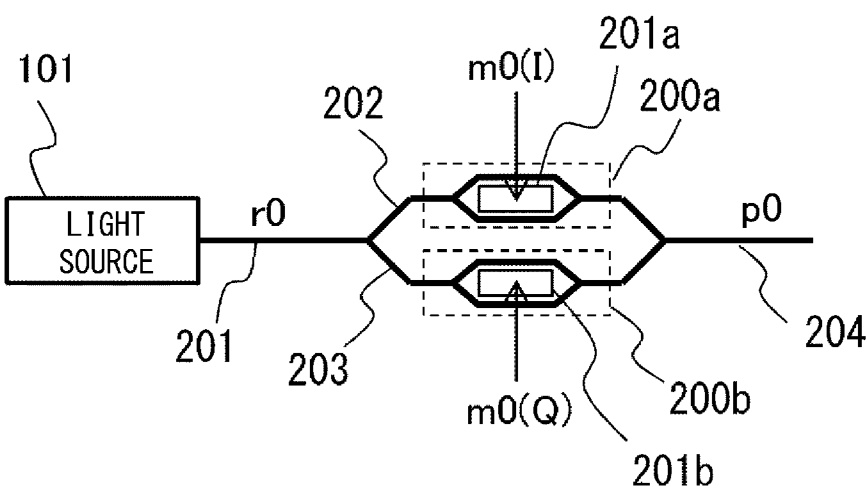
FIG. 8 is a configuration diagram illustrating a configuration example of an optical phase modulator according to the first example embodiment.

FIG. 8 illustrates a configuration example in which the light intensity phase modulator 103 is constituted of an MZ type IQ optical modulator. As illustrated in FIG. 8, the light intensity phase modulator 103 includes an arm 202 and an arm 203 which are branch waveguides between an input optical waveguide 201 and an output optical waveguide 204, and an optical modulation unit 200*a* and an optical modulation unit 200*b* are arranged in parallel with each other in the arm 202 and the arm 203, respectively. The optical modulation unit 200*a* and the optical modulation unit 200*b* are MZ type optical modulators.

The optical modulation unit 200*a* is a phase modulation unit that applies phase modulation in an in-phase direction. The optical modulation unit 200*a* has a phase modulation electrode 201*a*, and applies phase modulation to an input optical signal on a positive side or a negative side in the in-phase direction according to a voltage of the phase modulation signal m0(I) to be input to the phase modulation electrode 201*a*. The optical modulation unit 200*b* is a phase modulation unit that applies phase modulation in a quadrature direction. The optical modulation unit 200*b* has a phase modulation electrode 201*b*, and applies phase modulation to the input optical signal in the positive side or the negative side in the quadrature direction according to a voltage of the phase modulation signal m0(Q) to be input to the phase modulation electrode 201*b*.

By multiplexing the optical signal phase-modulated in the in-phase direction by the optical modulation unit 200*a* and the optical signal phase-modulated in the quadrature direction by the optical modulation unit 200*b*, an optical signal modulated in any phase can be generated. For example, when an optical signal (r0) of $\exp(j2\pi f_{10}t)$ is input, and a phase modulation signal m0(I) of $\cos(2\pi f_{11}t)$ and a phase modulation signal m0(Q) of $\sin(2\pi f_{11}t)$ are input, an optical signal (p0) of $\exp\{j2\pi(f_{10}+f_{11})t\}$ is output.

In FIG. 7, the light-transmitting unit 104 transmits the transmission light signal p0 including the transmission light pulse as ranging signal light. The light-transmitting unit 104 is a transmission optical system such as a lens, and emits the transmission light signal p0 as parallel light to the measurement object. The light-receiving unit 105 receives reflection light reflected from the measurement object, and outputs a reception light signal p1 including a reception light pulse. Similar to the light-transmitting unit 104, the light-receiving unit 105 is a reception optical system such as a lens.

Note that a light transmission/reception block 130 including optical systems of the light-transmitting unit 104 and the light-receiving unit 105 is illustrated in FIG. 7 as an example in which independent optical systems are configured on the transmission side and the reception side, respectively, but the present disclosure is not limited thereto. For example, transmission and reception may be performed by using the same optical system, and a transmission signal and a reception signal may be separated by using a circulator.

The light source device 106 is a light source device, such as a laser, that generates reference light r1 for interfering with the reception light signal p1. The light source device 106 is the same device as the light source device 101 on the transmission side, and the reference light r1 is an optical signal having the same frequency as that of the light source r0 on the transmission side (e.g., f0). Instead of the light source device 106, light of the light source device 101 on the transmission side may be branched to the reference light r1.

The coherent IQ optical receiver 107 causes the reception light signal p1 including the reception light pulse and the reference light r1 to interfere with each other, and generates an IQ reception signal m1. The IQ reception signal m1 includes a signal of an in-phase component (m1(I)) and a signal of a quadrature component (m1(Q)) with respect to the reference light r1. The coherent IQ optical receiver 107 includes a light interference system 107*a* and an optical/electrical converter 107*b*. The light interference system 107*a* causes the reception light signal p1 and the reference light r1 to interfere with each other, and generates an interference light signal p2 including a light signal p2(I) of the in-phase component and an optical signal p2(Q) of the quadrature component. The optical/electrical converter 107*b* photoelectrically converts the in-phase component and the quadrature component of the interference light signal p2 and generates the IQ reception signal m1.

An IQ signal (IQ reception signal) is a complex signal including an I signal (Isig) and a Q signal (Qsig), and can be expressed as IQ signal=Isig+jQsig (j is an imaginary number). Further, as the coherent IQ optical receiver 107, it is possible to use a coherent IQ optical receiver composed of a 90° hybrid mixer and a balanced receiver, which is used in general digital coherent optical communication, whereby it is possible to demodulate a signal transmitted from the transmission side on the reception side, based on the same principle as optical communication.

The ADC 108 is an Analog-to-digital converter (AD converter) that performs AD conversion on the IQ reception signal m1 subjected to photoelectric conversion. The reception pulse detection unit (light pulse extraction unit) 109 extracts, based on a light intensity of the IQ reception signal m1 subjected to AD conversion, only a reception light pulse portion of the reception signal.

The reception time extraction unit 110 identifies a reception time (an arrival time) of the reception light pulse from a rising timing of the signal extracted by the reception pulse detection unit 109. The distance calculation unit 111 calculates a distance of the measurement object from a transmission time of the transmission light pulse and the reception time of the reception light pulse. The distance calculation unit 111 calculates a distance of the measurement object, based on a time difference between a time of a transmission trigger signal Tr indicating a transmission timing of the transmission light pulse and a time of a rising timing of the reception light pulse.

The phase detection unit 112 detects a phase of the reception light pulse from the signal extracted by the reception pulse detection unit 109. The Doppler shift amount calculation unit 113 calculates a Doppler shift amount of the reception light pulse, based on the phase of the detected reception light pulse. The relative speed calculation unit 114 calculates a relative speed of the measurement object, based on the calculated Doppler shift amount.

FIG. 9 illustrates a specific example of a signal on the transmission side in the optical measurement device 100 of FIG. 7. As illustrated in FIG. 9, the light source device 101 on the transmission side generates the light source r0 having the optical frequency f0.

As illustrated in FIG. 9, the modulation signal generation unit 102 generates phase modulation signals m0(I) and m0(Q) for modulation in such a way that a phase inclination monotonously increases. For example, a phase of the phase modulation signal m0 (I) and a phase of the phase modulation signal m0(Q) are shifted by 90 degrees. Stated differently, the phase modulation signal m0(Q) is 90 degrees out of phase with respect to the phase modulation signal m0(I). As a result, the phase of the phase modulation signal m0 monotonously increases with time, as illustrated in FIG. 9. Note that portions other than the transmission light pulse pt are extinguished, and the phase becomes indefinite.

Herein, the phase monotonously increases (or increases) with time or monotonically decreases (or decreases) with time means that the phase monotonically increases (or increases) with time or monotonically decreases (or decreases) with time with respect to the phase of the light signal of the reference light source r0.

Figure 10:
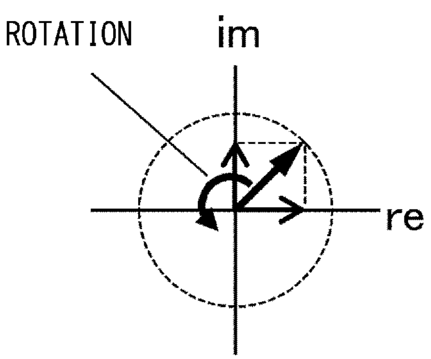
FIG. 10 is a diagram illustrating a phase vector of a transmission signal according to the first example embodiment.

For example, when the phase modulation signals m0(I) and m0(Q) are input to the optical modulation units 200*a* and 200*b* of the light intensity phase modulator 103 of FIG. 8, a transmission light pulse pt as illustrated in FIG. 9 is generated. The generated transmission light pulse pt becomes a light signal whose phase monotonously increases by the phase modulation signals m0(I) and m0(Q), and the frequency of this light signal becomes f0+foffset acquired by adding a frequency offset foffset to the frequency f0 of the reference light. As illustrated in FIG. 10, this phase vector is a vector that rotates counterclockwise with time on a complex plane by the phases of the phase modulation signals m0(I) and m0(Q), in other words, by the frequency offset (+foffset). The light-transmitting unit 104 transmits a transmission light signal p0 including the generated transmission light pulse pt. A light intensity of the transmission light signal p0 has a pulse shape as indicated by a broken line of p01 in FIG. 9.

Figure 11:
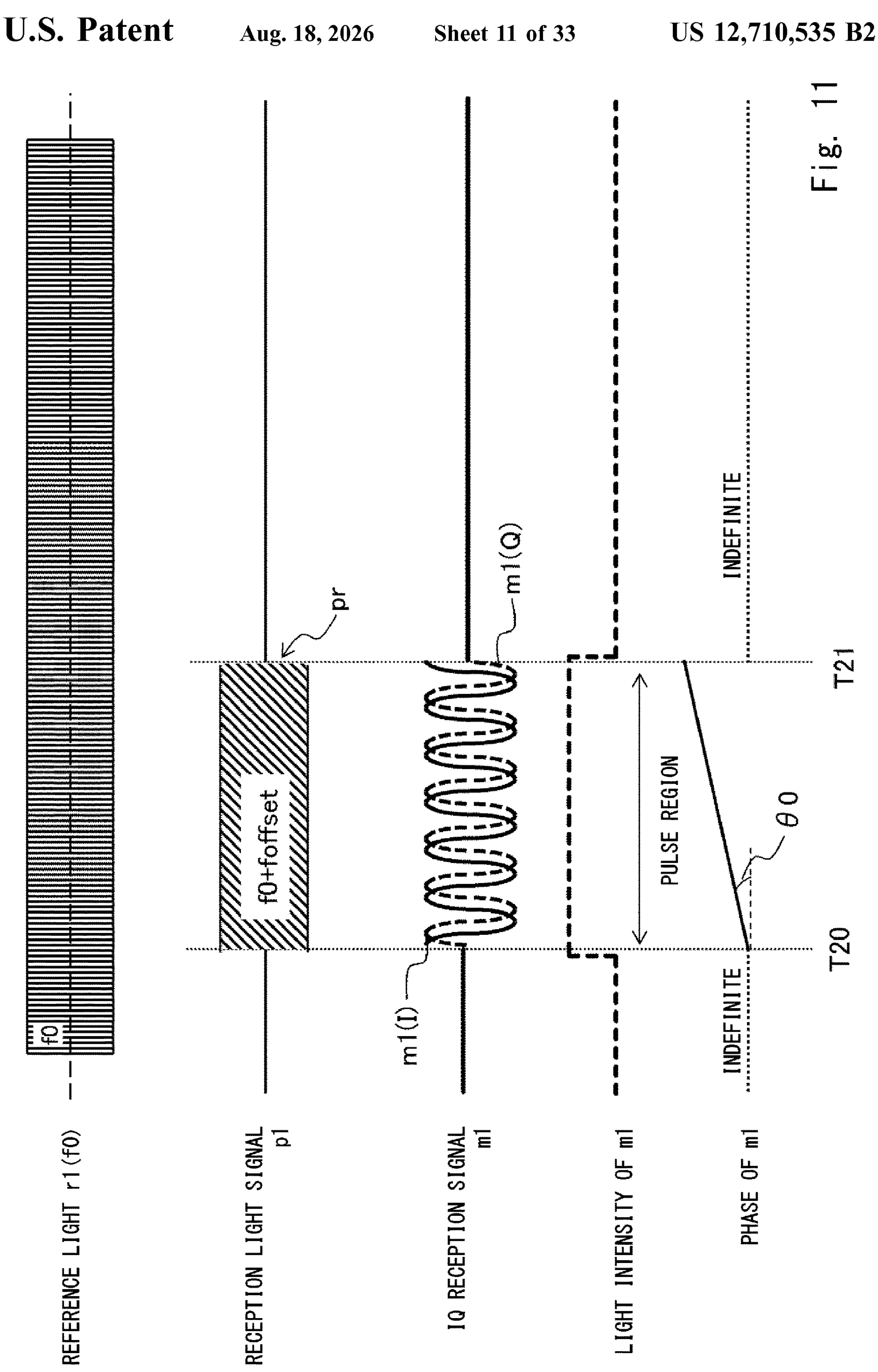
FIG. 11 is a timing chart illustrating a reception signal according to the first example embodiment.

FIGS. 11 and 12 illustrate specific examples of signals on the reception side in the optical measurement device 100 of FIG. 7. FIG. 11 is an example of a reception signal when the measurement object is a stationary object, and FIG. 12 is an example of a reception signal when the measurement object is a moving object. As illustrated in FIGS. 11 and 12, the light source device 106 on the reception side generates the reference light r1 having the same optical frequency f0 as that on the transmission side. Alternatively, as described above, the light of the light source device 101 on the transmission side may be branched to the reference light r1.

In the example of FIG. 11, the light-receiving unit 105 receives the reception light signal p1 including the reception light pulse pr reflected from the stationary object. In this case, since the measurement object is stationary, the signal is the same as that on the transmission side illustrated in FIG. 9. Namely, the optical frequency of the reception light pulse is f0+foffset.

The light interference system 107*a* of the coherent IQ optical receiver 107 causes the reception light signal p1 and the reference light r1 to interfere with each other according to a general coherent IQ reception principle used in digital coherent optical communication and generates an IQ reception signal m1. In FIG. 11, the IQ reception signals m1(I) and m1(Q) being output from the coherent IQ optical receiver 107 have the same waveforms as the phase modulation signals m0(I) and m0(Q) on the transmission side. In other words, in the reception light pulse pr, the IQ reception signal m1(Q) is shifted by 90 degrees from the IQ reception signal m1(I), similarly to the transmission light pulse pt.

As illustrated in FIG. 11, a light intensity of the IQ reception signal m1 has a pulse waveform of a constant level from times T20 to T21, and the reception pulse detection unit 109 detects a pulse region from times T20 to T21 by detecting a range exceeding a predetermined threshold. As illustrated in FIG. 11, the phase detection unit 112 detects a phase of the IQ reception signal m1 in a range from times T20 to T21 of the detected pulse region. The detected phase monotonically increases with time, similar to the transmitting side. As described in FIG. 6, in this case, an inclination θ0 of the phase is 2π×foffset.

On the other hand, in the example of FIG. 12, the light-receiving unit 105 receives the reception light signal p1 including the reception light pulse pr reflected from the moving object. In this case, since the measurement object is moving, the signal on the transmission side illustrated in FIG. 9 becomes a Doppler shifted signal. Thus, the optical frequency of the reception light pulse is f0+foffset+fshift.

Then, the IQ reception signals m1(I) and m1(Q) being output from the coherent IQ optical receiver 107 have waveforms different from the phase modulation signals m0(I) and m0(Q) on the transmission side. For example, the reception light pulse pr becomes an IQ reception signal m1 of foffset+fshift whose frequency is higher by fshift than the IQ reception signal m1 of FIG. 11 without Doppler shift.

At this time, the light intensity of the IQ reception signal m1 has a pulse waveform of a constant level from times T20 to T21 as in FIG. 11, and the reception pulse detection unit 109 detects a pulse region from times T20 to T21. As illustrated in FIG. 12, the phase detection unit 112 detects the phase of the IQ reception signal m1 in a range from times T20 to T21 of the detected pulse region. The detected phase monotonically increases with a steeper inclination than in FIG. 11. As explained in FIG. 6, in this case, the inclination θ1 of the phase is 2π×(foffset+fshift).

The Doppler shift amount calculation unit 113 calculates the Doppler shift amount of the reception light pulse by acquiring a difference between the inclination θ0 of the phase of the reception light pulse without Doppler shift in FIG. 11 and the inclination θ1 of the phase of the reception light pulse with Doppler shift in FIG. 12. For example, the inclination θ0 of the phase of the reception light pulse to be received from the stationary object may be measured in advance, and when the inclination θ1 of the phase of the reception light pulse to be received from the moving object is measured, the difference between 01 and 00 may be acquired. Alternatively, the inclination of the phase of the transmission light pulse (transmission light signal) may be used as θ0. The relative speed calculation unit 114 calculates the relative speed of the measurement object from the above-mentioned equations (2) and (3) by using the calculated Doppler shift amount.

As described above, in the present example embodiment, in the optical measurement device of the ToF ranging system, the distance to the measurement object and the relative speed of the measurement object can be measured at a time by calculating the relative speed of the measurement object from the Doppler shift amount of the frequency of the reception light pulse received from the measurement object.

In particular, in the present example embodiment, measurement accuracy can be improved by detecting the phase of the reception light pulse and calculating the Doppler shift amount, based on a change amount of the detected phase (an inclination with respect to time). Since a pulse width Tw of a light pulse of the ToF ranging system is very narrow such as several tens ns, it is difficult to achieve the calculation of the Doppler shift amount by a Fast Fourier Transform (FFT) circuit. Even in the FFT circuit, it is possible to calculate the Doppler shift amount with the same accuracy regardless of the circuit scale, but it is necessary to increase the number of measurements (resolution) of the FFT in order to achieve high accuracy. In the present example embodiment, by using the phase change amount of the light pulse, the Doppler shift amount can be calculated with high accuracy with a smaller calculation amount (smaller circuit scale) than that of the FFT circuit.

Second Example Embodiment

Hereinafter, a second example embodiment will be explained with reference to the drawings. In the present example embodiment, in the optical measurement device and the optical measurement method of the first example embodiment, a transmission light pulse including an optical signal region having a monotonically increasing phase (positive frequency offset) and a light signal region having a monotonically decreasing phase (positive frequency offset) is transmitted.

Figure 13:
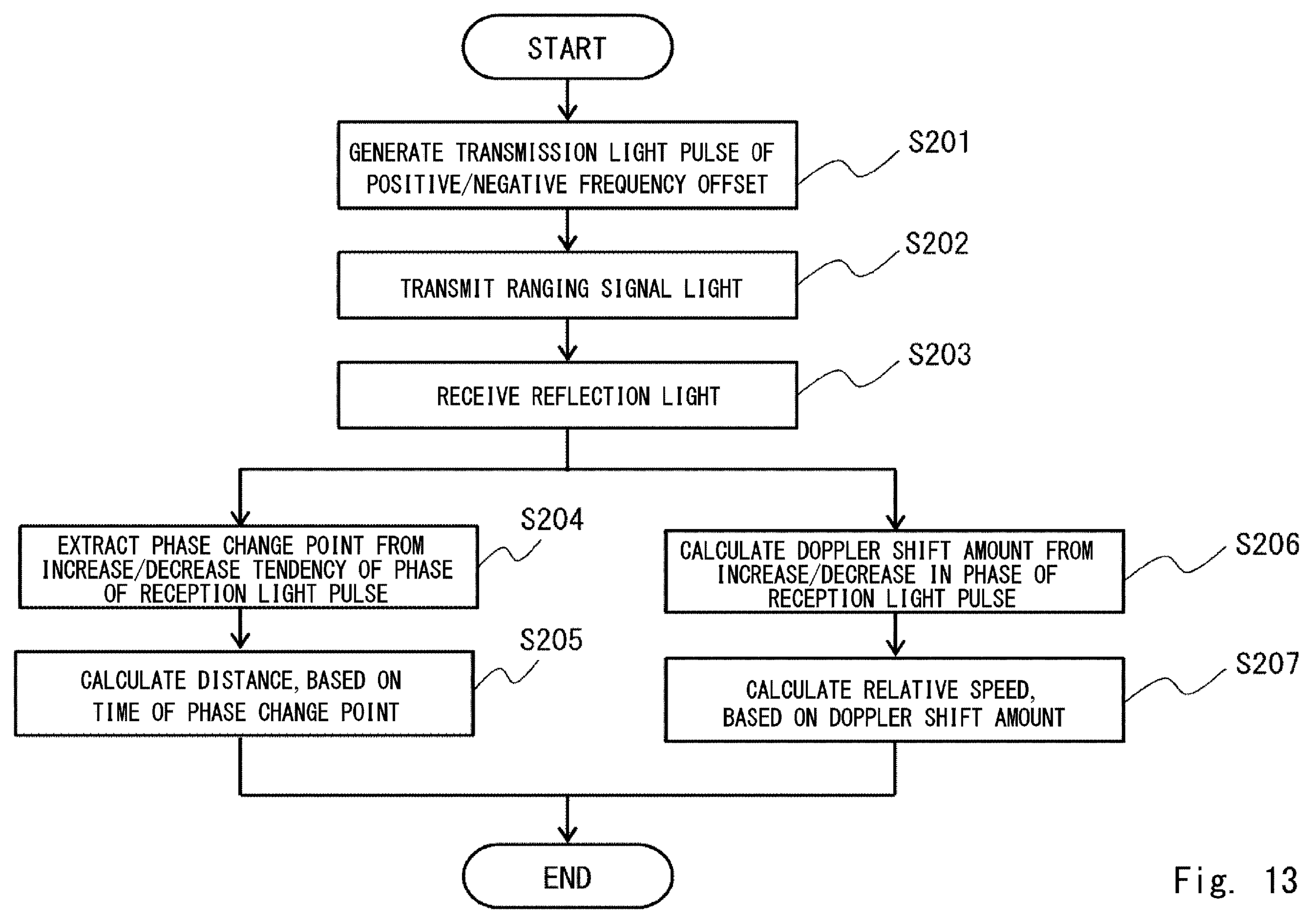
FIG. 13 is a flowchart illustrating an optical measurement method according to a second example embodiment.
Figure 14:
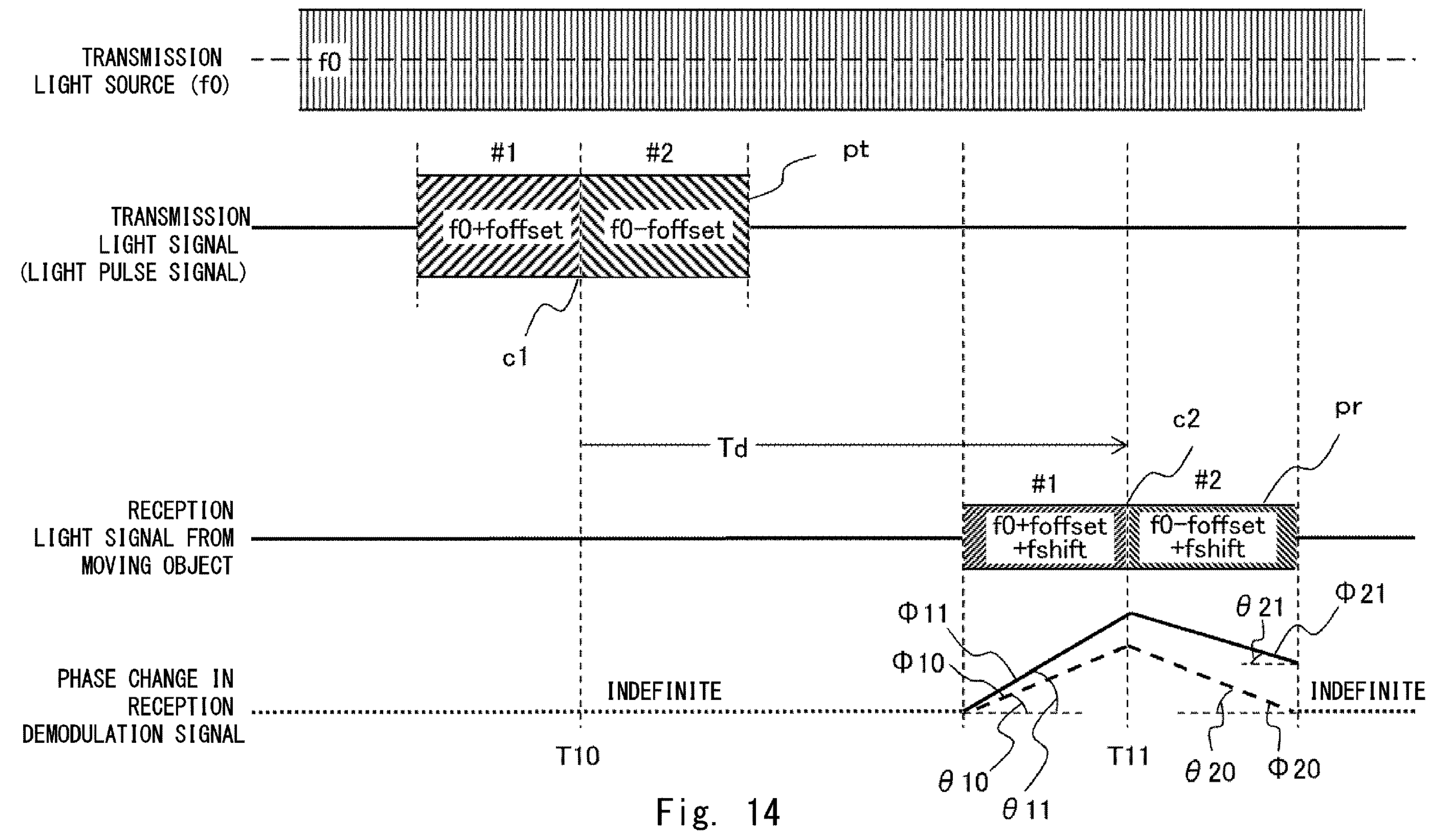
FIG. 14 is a timing chart illustrating an optical measurement method according to the second example embodiment.
Figure 15:
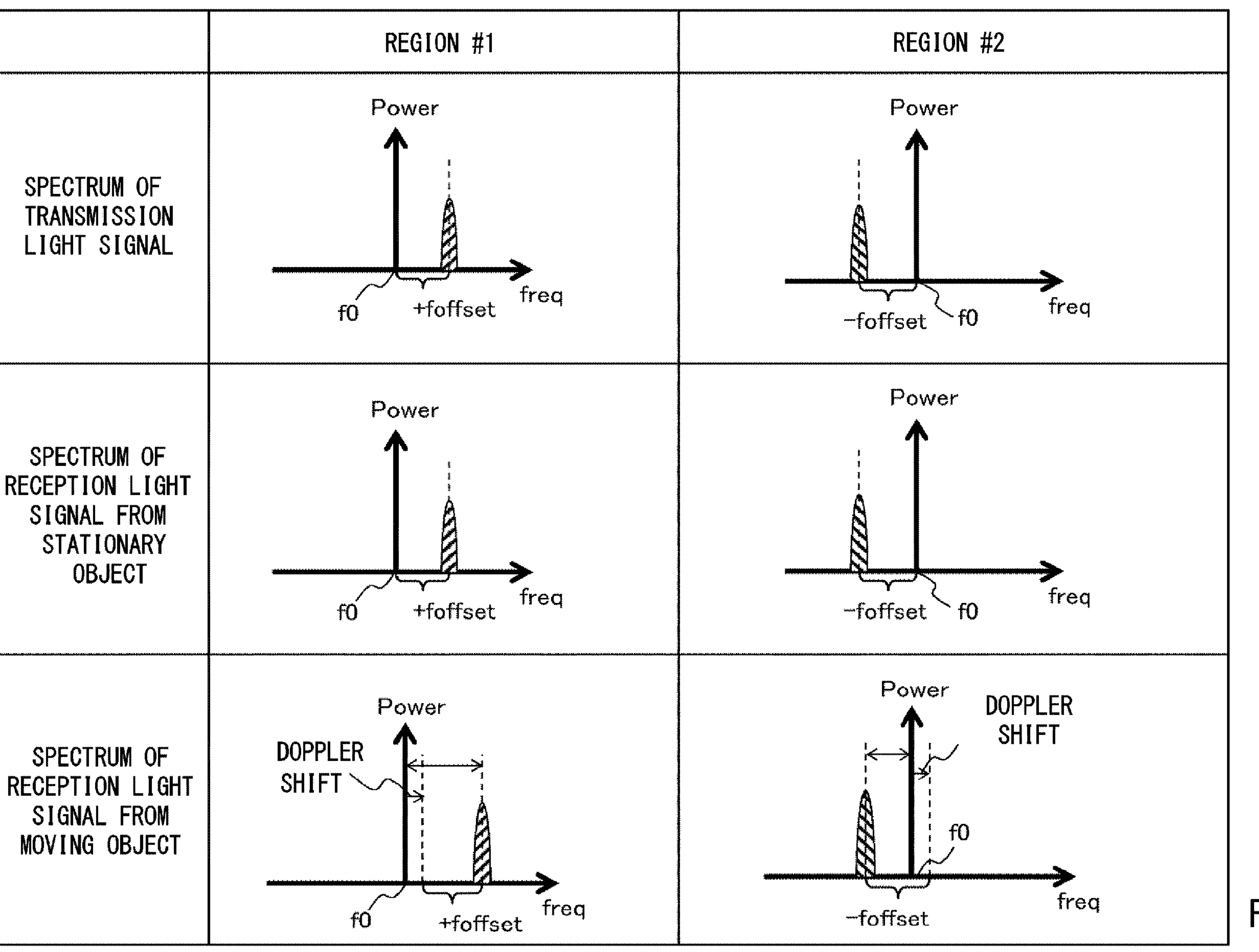
FIG. 15 is a frequency spectrum diagram of an optical signal in the optical measurement method according to the second example embodiment.

FIGS. 13 and 14 illustrate an optical measurement method according to the present example embodiment, and FIG. 15 illustrates a frequency spectrum of a light signal in the optical measurement method. As illustrated in FIG. 13, in the present example embodiment, a transmission light pulse is generated by modulation using a positive frequency offset (first frequency offset) and a negative frequency offset (second frequency offset) on a transmission side of the optical measurement device (S201), and the generated transmission light pulse is transmitted as ranging signal light (S202). The positive frequency offset is an offset in a positive direction with respect to a frequency of a reference light source, and the negative frequency offset is an offset in a negative direction with respect to the frequency of the reference light source.

As illustrated in FIG. 14, in a region #1 (first phase modulation portion) of a first half portion of a transmission light pulse pt, a light signal of a transmission light source having a frequency f0 is modulated in such a way that the phase monotonically increases (changes with a first inclination with respect to time) by applying a positive frequency offset (+foffset), and in a region #2 (second phase modulation portion) of a second half portion of the transmission light pulse pt, the light signal is modulated in such a way that the phase monotonically decreases (changes with a second inclination with respect to time) by applying a negative frequency offset (−foffset). In the region #1, the optical frequency is f0+foffset, and in the region #2, the optical frequency is f0-foffset. In the transmission light pulse pt, a point at which a phase monotonously increasing by the optical frequency f0+foffset is switched to a phase monotonously decreasing by the optical frequency f0-foffset becomes a phase change point c1. As illustrated in FIG. 15, a frequency spectrum of the transmission light pulse pt has a frequency component of foffset on the positive side in the region #1 and a frequency component of −foffset on the negative side in the region #2.

Next, as illustrated in FIG. 13, on a reception side of the optical measurement device, reflection light from a measurement object is received (S203), a phase change point of a reception light pulse included in the received reflection light is extracted from a phase increase/decrease tendency of the reception light pulse (S204), and a distance of the measurement object is calculated based on times of the phase change points of the transmission light pulse and the reception light pulse (S205). As illustrated in FIG. 14, a phase change point c2 at which an increase/decrease tendency (inclination) of phases of a region #1 of a first half portion and a region #2 of a second half portion of a reception light pulse pr are switched is extracted. In the reception light pulse pr, the phase of the region #1 monotonously increases by an optical frequency f0+foffset(+fshift), the phase of the region #2 monotonously decreases by an optical frequency f0−foffset(+fshift), and the point at which the phase is switched from monotonic increase to monotonic decrease is detected. A distance of the measurement object is acquired based on a return delay time Td from time T10 of the phase change point c1 of the transmission light pulse pt to time T11 of the phase change point c2 of the reception light pulse pr.

In the present example embodiment, even when a signal in the vicinity of a transition between the first half portion and the second half portion of the reception light pulse is disturbed, the transition between the first half portion and the second half portion can be predicted from a phase increment of the first half portion and a phase decrement of the second half portion, and therefore, influences of noise and waveform distortion can be suppressed and ranging accuracy can be improved.

As illustrated in FIG. 13, on the reception side of the optical measurement device, a Doppler shift amount is calculated from the increase/decrease of the phase of the reception light pulse (S206), and the relative speed of the measurement object is calculated based on the calculated Doppler shift amount (S207). As illustrated in FIG. 14, similarly to FIG. 6 of the first example embodiment, when the measurement object is a moving object, a reception light pulse pr having an optical frequency shifted by a Doppler shift amount (fshift) from the transmission light pulse pt is received.

As illustrated in FIG. 15, a frequency spectrum of the reception light pulse pr has a frequency distribution of foffset on the positive side in the region #1 and −foffset on the negative side in the region #2, similarly to the transmission signal, when the measurement object is a stationary object and there is no Doppler shift. When the measurement object is a moving object and there is a Doppler shift, signals on the positive side and on the negative side are each shifted by the Doppler shift amount (fshift), as for the frequency spectrum of the reception light pulse pr. Thus, in the region #1, the frequency component on the positive side is more away from f0 by fshift than foffset, and in the region #2, the frequency component on the negative side is brought closer to f0 by fshift than −foffset.

Then, as illustrated in FIG. 14, inclinations θ10 and θ20 of phases Φ10 and θ20 in the case where the measurement object is a stationary object and inclinations θ11 and θ21 of phases Φ11 and θ21 in the case where the measurement object is a moving object are different in the region #1 and the region #2 of the reception light pulse pr, respectively. In other words, the inclinations θ11 and θ21 of the phases Φ11 and Φ21 of the reception light pulse to be received from the moving object have a steep inclination of increase by the Doppler shift in the region #1 and a gradual inclination of decrease by the Doppler shift in the region #2, as compared with the inclinations θ10 and θ20 of the phases Φ10 and Φ20 of the reception light pulse to be received from the stationary object. Specifically, when there is no Doppler shift, the inclination θ10 of the region #1 is 2π×foffset, and the inclination θ20 of the region #2 is −2π×foffset, and when there is a Doppler shift, the inclination θ11 of the region #1 is 2π×(foffset+fshift) and the inclination θ21 of the region #2 is 2π×(−foffset+fshift).

As described above, when there is a Doppler shift, absolute values of the inclinations of the phases of the region #1 and the region #2 of the reception light pulse become unbalanced. Therefore, in the present example embodiment, the inclinations of the region #1 and the region #2 are collectively acquired as a Doppler shift amount (fshift). Namely, as illustrated in the following equation (4), the Doppler shift amount is acquired by adding the absolute value of the inclination of the phase of each of the region #1 and the region #2 and dividing by 2. As a result, it is possible to acquire a frequency shift amount with higher accuracy that does not depend on the offset frequency. In other words, by using this configuration, it is possible to cancel a variation component other than a frequency shift caused by the Doppler shift, such as a variation in the foffset due to imperfections in the characteristics of an optical ranging pulse generation unit, and thus it is possible to acquire a pure Doppler shift amount with high accuracy. As in the first example embodiment, the Doppler shift amount may be calculated in one of the region #1 and the region #2 or in each of the regions #1 and #2.

[Equation 4]

$$\frac{|2\pi\times(f_{offset}+f_{shift})|+|2\pi\times(-f_{offset}+f_{shift})|}{2}=\frac{4\pi\times 2f_{shift}}{2}=2\pi\times f_{shift} \quad (4)$$

Figure 16:
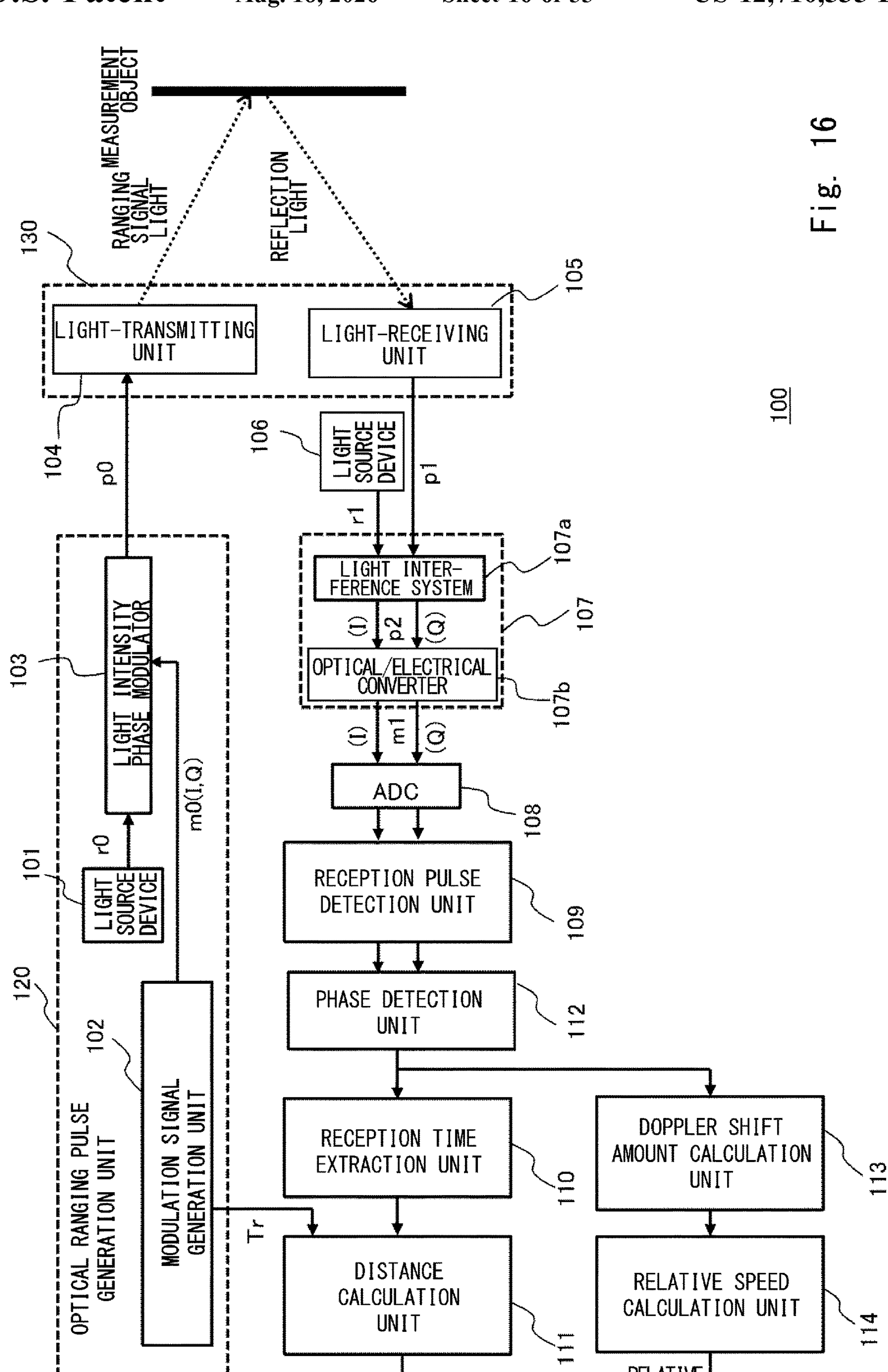
FIG. 16 is a configuration diagram illustrating a configuration example of an optical measurement device according to the second example embodiment.

FIG. 16 illustrates a configuration of an optical measurement device according to the present example embodiment. As illustrated in FIG. 16, the optical measurement device 100 according to the present example embodiment includes the same functional blocks as those of the first example embodiment. Explaining a difference from the first example embodiment, in the present example embodiment, a detection result of the phase detection unit 112 is supplied to each of the reception time extraction unit 110 and the Doppler shift amount calculation unit 113.

Further, in the present example embodiment, the light intensity phase modulator 103 applies a monotonically increasing or monotonically decreasing phase modulation to a light source r0, based on the phase modulation signal m0 (I, Q) and generates a transmission light signal p0 including a transmission light pulse. The light intensity phase modulator 103 is, for example, an MZ type IQ optical modulator as illustrated in FIG. 8, similarly to the first example embodiment.

In the present example embodiment, the reception time extraction unit (phase change point detection unit) 110 detects a phase change point at which the phase of the reception light pulse, which is detected by the phase detection unit 112, is switched from a monotonic increase to a monotonic decrease, and extracts a time thereof. The distance calculation unit 111 calculates the distance of the measurement object from the time of the phase change point of the transmission light pulse and the time of the phase change point of the reception light pulse. The distance calculation unit 111 calculates the distance of the measurement object, based on a time difference between a transmission time of a transmission trigger signal Tr indicating a timing of the phase change point of the transmission light pulse and a reception time of the phase change point of the reception light pulse.

Further, in the present example embodiment, the Doppler shift amount calculation unit 113 calculates the Doppler shift amount of the reception light pulse, including a phase change amount of the first half portion and a phase change amount of the second half portion of the reception light pulse that is detected by the phase detection unit 112.

FIG. 17 illustrates a specific example of a signal on the transmission side in the optical measurement device 100 of FIG. 16. As illustrated in FIG. 17, the light source device 101 on the transmission side generates a light source r0 having an optical frequency f0, similarly to the first example embodiment.

As illustrated in FIG. 17, the modulation signal generation unit 102 generates phase modulation signals m0(I) and m0(Q) for modulating the regions #1 and #2 in such a way that their phase inclinations are different from each other. In the region #1, a phase of the phase modulation signal m0(I) and a phase of the phase modulation signal m0(Q) are shifted by 90 degrees as in the first example embodiment. In the region #2, the phase of the phase modulation signal m0(I) is the same as that of the region #1, and the phase of the phase modulation signal m0(Q) is inverted from that of the region #1 (shifted by 180 degrees). Stated differently, the phase modulation signal m0(Q) is 90 degrees ahead of the phase modulation signal m0(I). Then, as illustrated in FIG. 17, the phase of the phase modulation signal m0 monotonously increases with time in the region #1 and monotonously decreases with time in the region #2.

Figure 18:
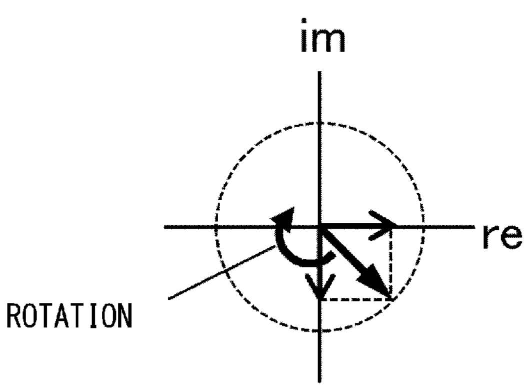
FIG. 18 is a diagram illustrating a phase vector of a transmission signal according to the second example embodiment.

For example, as in the first example embodiment, when the phase modulation signals m0(I) and m0(Q) are input to the optical modulation units **200*a* and 200*b* of the light intensity phase modulator 103 in FIG. 8, a transmission light pulse pt as illustrated in FIG. 17 is generated. The portion of the region #1 of the generated transmission light pulse pt becomes an optical signal whose phase monotonously increases by the phase modulation signals m0(I) and m0(Q), similarly to the first example embodiment, and the frequency of this optical signal becomes f0+foffset acquired by adding the frequency offset foffset to the frequency f0 of reference light. The portion of the region #2 of the transmission light pulse pt becomes an optical signal whose phase monotonously decreases by the phase modulation signals m0(I) and m0(Q), and the frequency of this optical signal becomes f0−foffset acquired by subtracting the frequency offset foffset from the frequency f0 of the reference light. As illustrated in FIG. 18**, the phase vector of the region #2 is a vector that rotates clockwise over time on the complex plane by the phases of the phase modulation signals m0(I) and m0(Q), in other words, by the frequency offset (−foffset).

Figure 19:
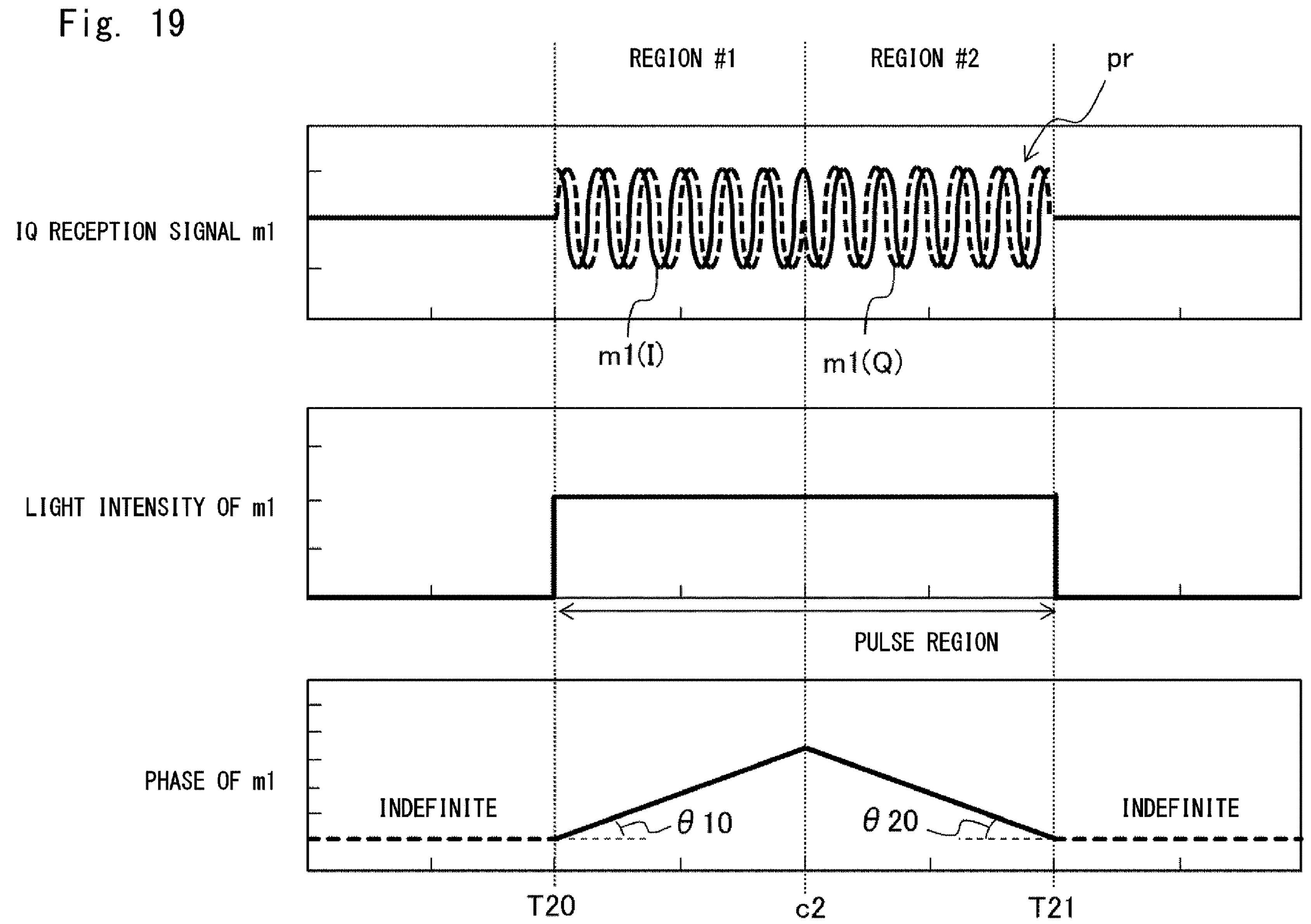
FIG. 19 is a timing chart illustrating a reception signal according to the second example embodiment.

FIGS. 19 and 20 illustrate specific examples of signals on the reception side in the optical measurement device 100 of FIG. 16. FIG. 19 is an example of a reception signal when the measurement object is a stationary object, and FIG. 20 is an example of a reception signal when the measurement object is a moving object.

In the example of FIG. 19, the light-receiving unit 105 receives a reception light signal p1 including the reception light pulse pr reflected from the stationary object. In this case, since the measurement object is stationary, the signal is the same as that on the transmission side illustrated in FIG. 17. Namely, the optical frequency of the region #1 of the reception light pulse is f0+foffset, and the optical frequency of the region #2 is f0−foffset. Also herein, as described in the first example embodiment, the same signal as that of the transmission side is demodulated on the reception side, based on the principle of the coherent IQ optical receiver used in the digital coherent optical communication.

Therefore, as illustrated in FIG. 19, IQ reception signals m1(I) and m1(Q) being output from the coherent IQ optical receiver 107 have the same waveform as the phase modulation signals m0(I) and m0(Q) on the transmission side. In short, in the reception light pulse pr, similarly to the transmission light pulse pt, in the region #1, the IQ reception signal m1(Q) is shifted by 90 degrees from the IQ reception signal m1(I), and in the region #2, the IQ reception signal m1(I) is in the same phase as the region #1, and the IQ reception signal m1(Q) is inverted from the region #1. Stated differently, in the region #1, the IQ reception signal m1(Q) is a signal delayed in phase by 90 degrees with respect to the IQ reception signal m1(I), and in the region #2, the IQ reception signal m1(Q) is a signal advanced in phase by 90 degrees with respect to the IQ reception signal m1(I).

As illustrated in FIG. 19, a light intensity of the IQ reception signal m1 has a pulse waveform of a constant level from times T20 to T21, and the reception pulse detection unit 109 detects a pulse region from times T20 to T21 as in the first example embodiment. As in FIG. 19, the phase detection unit 112 detects a phase of the IQ reception signal m1 in a range from times T20 to T21 of the detected pulse region. The detected phase monotonically increases with time in the region #1 and monotonically decreases with time in the region #2, similarly to the transmission side. As explained in FIG. 14, in this case, the inclination $\theta 10$ of the phase of the region #1 is $2\pi \times$foffset, and the inclination $\theta 20$ of the phase of the region #2 is $-2\pi \times$foffset.

The reception time extraction unit 110 detects a phase change point c2, based on a change in the phase of the IQ reception signal m1. In this example, a point at which the phase is switched from monotonic increase to monotonic decrease is detected as the phase change point c2. In addition, the reception time extraction unit 110 may detect a vertex (maximum value) having the largest phase as a phase change point. For example, when the phase of the region #1 monotonously decreases and the phase of the region #2 monotonously increases, the smallest vertex (minimum value) of the phase may be detected as the phase change point. Further, approximate straight lines approximating inclinations of the monotonously increasing and monotonously decreasing phases may be acquired from sampling data of the phases of the region #1 and the region #2, and a phase change point may be detected from an intersection of the approximate straight lines.

On the other hand, in the example of FIG. 20, the light-receiving unit 105 receives a reception light signal p1 including the reception light pulse pr reflected from the moving object. In this case, since the measurement object is moving, the signal on the transmission side illustrated in FIG. 17 is a Doppler shifted signal. Namely, the optical frequency of the region #1 of the reception light pulse is f0+foffset+fshift, and the optical frequency of the region #2 is f0−foffset+fshift.

Then, the IQ reception signals m1(I) and m1(Q) being output from the coherent IQ optical receiver 107 have different waveforms from the phase modulation signals m0(I) and m0(Q) on the transmission side in the region #1 and the region #2, respectively. For example, in the region #1, the IQ reception signal m1 is higher in frequency by fshift than the IQ reception signal m1 in FIG. 19 without Doppler shift, and in the region #2, the IQ reception signal m1 is lower in frequency by fshift than the IQ reception signal m1 in FIG. 19 without Doppler shift.

At this time, since the light intensity of the IQ reception signal m1 has a pulse waveform of a constant level from times T20 to T21 as in FIG. 19, the reception pulse detection unit 109 detects a pulse region from times T20 to T21. As in FIG. 20, the phase detection unit 112 detects the phase of the IQ reception signal m1 in a range from times T20 to T21 of the detected pulse region. The detected phase monotonically increases with a steep inclination in the region #1 and monotonically decreases with a gradual inclination in the region #2, as compared with FIG. 19. As described in FIG. 14, in this case, the inclination θ11 of the phase of the region #1 is 2π×(foffset+fshift), and the inclination θ21 of the phase of the region #2 is 2π×(−foffset+fshift).

The Doppler shift amount calculation unit 113 acquires the Doppler shift amount by adding the absolute value of the inclination of each of the region #1 and the region #2, and dividing by 2 using the above equation (4). Further, the relative speed calculation unit 114 calculates the relative speed of the measurement object from the above-mentioned equations (2) and (3), similarly to the first example embodiment, by using the calculated Doppler shift amount.

As described above, in the present example embodiment, phase modulation is applied by the monotonously increasing phase and monotonously decreasing phase with respect to the first half and the second half of the transmission light pulse, and the distance of the measurement object is measured by detecting the phase change point of the received reception light pulse. As a result, even when there is noise or waveform distortion in the reception light pulse, an arrival time can be measured with high accuracy, and ranging accuracy can be improved. In particular, by modulating the phase of the transmission light pulse by a monotonously increasing phase and a monotonously decreasing phase, the inclination of the monotonously increasing phase and the inclination of the monotonously decreasing phase can be predicted (approximated) from the phase information of the reception light pulse, and therefore the ranging accuracy can be improved.

In the present example embodiment, the Doppler shift amount is calculated based on the phase change amounts of the first half and the second half of the reception light pulse. The Doppler shift amount is acquired by adding the absolute value of the phase inclination of each of the first half region and the second half region of the reception light pulse and dividing by 2. As a result, since the frequency offset can be removed from the calculation of the Doppler shift amount, the Doppler shift amount can be accurately acquired without depending on the variation of the frequency offset due to imperfections such as the characteristics of an optical ranging pulse generation unit.

Third Example Embodiment

Hereinafter, a third example embodiment will be explained with reference to the drawings. In the present example embodiment, in the optical measurement device and the optical measurement method of the second example embodiment, a transmission light pulse having a monotonically increasing phase (positive frequency offset) and a transmission light pulse having a monotonically decreasing phase (negative frequency offset) are wavelength-multiplexed, and a multiplexed optical signal is transmitted.

Figure 21:
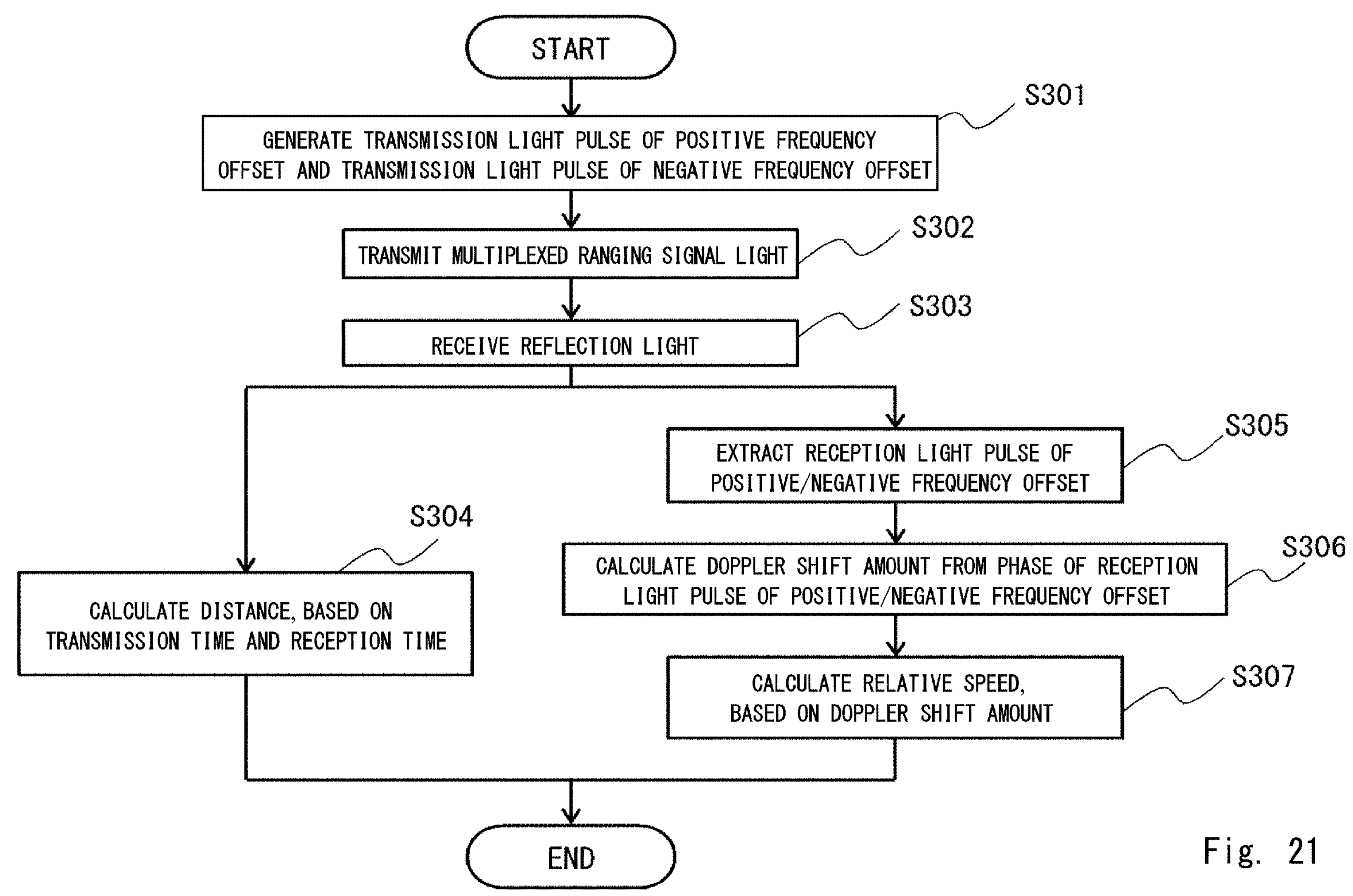
FIG. 21 is a flowchart illustrating an optical measurement method according to a third example embodiment.
Figure 22:
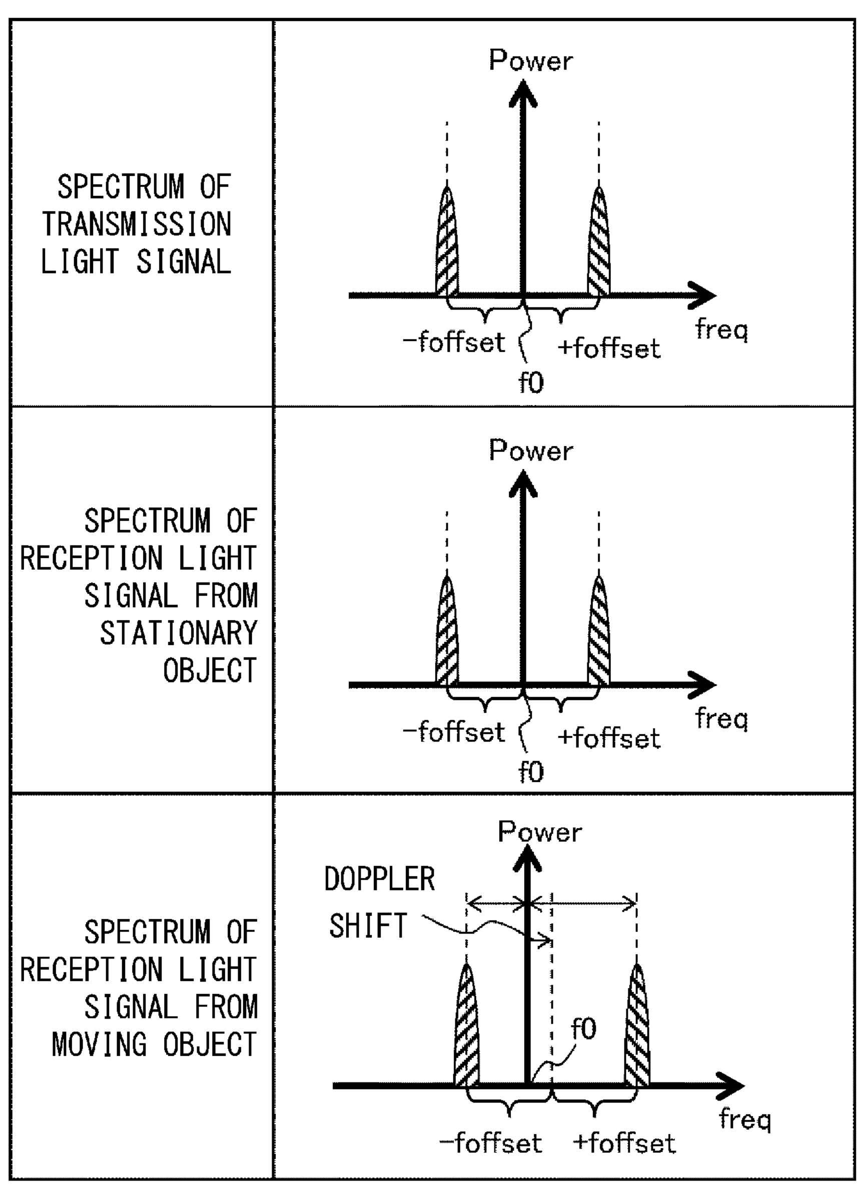
FIG. 22 is a frequency spectrum diagram of an optical signal in the optical measurement method according to the third example embodiment.

FIG. 21 illustrates an optical measurement method according to the present example embodiment, and FIG. 22 illustrates a frequency spectrum of an optical signal in the optical measurement method. As illustrated in FIG. 21, in the present example embodiment, a transmission light pulse having a positive frequency offset and a transmission light pulse having a negative frequency offset are generated on a transmission side of an optical measurement device (S301), and a multiplexed signal (wavelength-multiplexing signal) acquired by combining two transmission light pulses is transmitted as ranging signal light (S302).

In the second example embodiment, as illustrated in FIG. 15, in the transmission light pulse pt, an optical signal of an optical frequency f0+foffset is transmitted in the region #1, and an optical signal of an optical frequency f0−foffset is transmitted in the region #2. In the second example embodiment, it can also be said that each light signal is time-division multiplexed. On the other hand, in the present example embodiment, as illustrated in FIG. 22, the light signal (light pulse) of the optical frequency f0+foffset and the light signal (light pulse) of the optical frequency f0−foffset are wavelength-multiplexed and transmitted at the same time. A frequency spectrum of a transmission light pulse pt is symmetrical on a positive side and a negative side with f0 as a center, has a frequency component of foffset on a positive side, and has a frequency component of −foffset on a negative side.

Next, as illustrated in FIG. 21, on a reception side of the optical measurement device, reflection light from a measurement object is received (S303), and a distance of the measurement object is calculated based on a transmission time at which ranging signal light has been transmitted and a reception time at which reflection light has been received (S304). The distance of the measurement object is acquired from a time difference between a time of a predetermined position of a transmission light signal (multiplexed signal) and a time of a predetermined position of a reception light signal.

Further, on the reception side of the optical measurement device, a reception light pulse with a positive frequency offset and a reception light pulse with a negative frequency offset are extracted from the reception light signal (S305), the Doppler shift amount is calculated from phases of the extracted reception light pulse with the positive frequency offset and the extracted reception light pulse with the negative frequency offset (S306), and a relative speed of the measurement object is calculated based on the calculated Doppler shift amount (S307).

As illustrated in FIG. 22, when the measurement object is a stationary object and there is no Doppler shift, a frequency spectrum of the reception light signal has an intensity distribution of foffset on the positive side and −foffset on the negative side with f0 as the center, similarly to the transmission signal. At this time, when a frequency component on the positive side (positive frequency component) from f0 is extracted from the reception light signal and a frequency component on the negative side (negative frequency component) from f0 is extracted therefrom, a frequency of the frequency component (reception light pulse) on the positive side is +foffset, and a frequency of the frequency component (reception light pulse) on the negative side is −foffset.

When the measurement object is a moving object and there is a Doppler shift, in the frequency spectrum of the reception light signal, each signal of the positive and negative frequency components is shifted by a Doppler shift amount (fshift). Namely, the positive frequency component is more separate from f0 by fshift than foffset and the negative frequency component is brought closer to f0 by fshift than −foffset. At this time, when the positive frequency component is extracted and the negative frequency component is extracted from the reception light signal, the positive frequency component has a frequency of foffset+fshift, and the negative frequency component has a frequency of −foffset+fshift.

Characteristics of the positive frequency component are the same as those of the region #1 of the reception light pulse of the second example embodiment, and characteristics of the negative frequency component are the same as those of the region #2 of the reception light pulse of the second example embodiment. Therefore, in the present example embodiment, similarly to the second example embodiment, the Doppler shift amount is acquired by adding an absolute value of a phase inclination of each of the positive frequency component (reception light pulse) and the negative frequency component (reception light pulse) and by dividing by 2.

Figure 23:
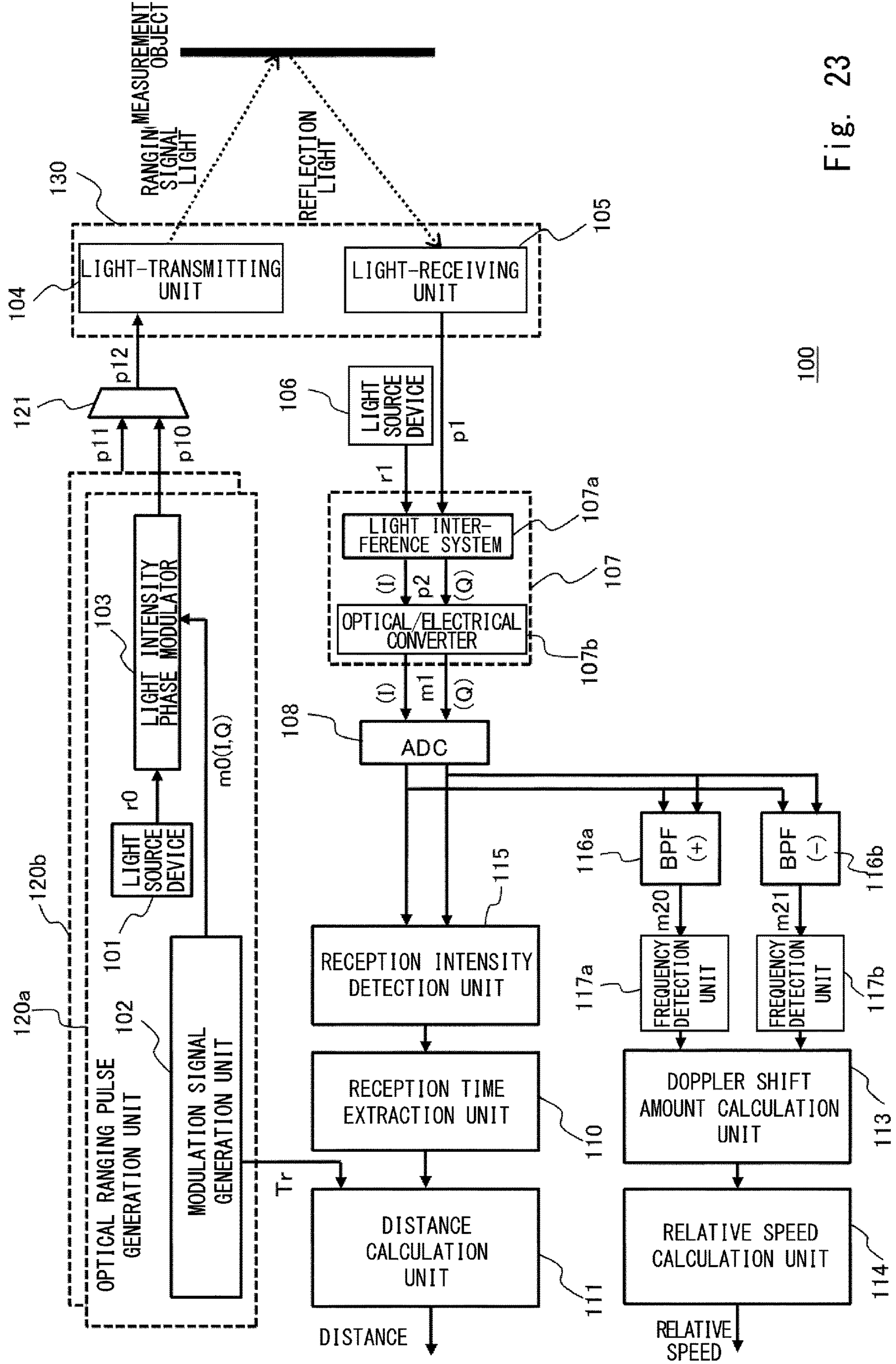
FIG. 23 is a configuration diagram illustrating a configuration example of the optical measurement device according to the third example embodiment.

FIG. 23 illustrates a configuration of an optical measurement device according to the present example embodiment. As illustrated in FIG. 23, the optical measurement device 100 according to the present example embodiment includes two optical ranging pulse generation units 120*a* and 120*b*, a multiplexer 121, a reception intensity detection unit 115, BPFs 116*a* and 116*b*, and frequency detection units 117*a* and 117*b*, as compared with the first and second example embodiments. For example, a reception intensity detection unit 115 is provided instead of the reception pulse detection unit 109 of the first and second example embodiments. The phase detection unit 112 of the first and second example embodiments is not illustrated, but may be included in the Doppler shift amount calculation unit 113.

The optical ranging pulse generation unit (first light pulse generation unit) 120*a* generates a transmission light pulse (first light pulse) with a positive frequency offset, and the optical ranging pulse generation unit (second light pulse generation unit) 120*b* generates a transmission light pulse (second light pulse) with a negative frequency offset. A configuration of the optical ranging pulse generation units 120*a* and 120*b* is similar to that of the first and second example embodiments. The light intensity phase modulator 103 of the optical ranging pulse generation unit 120*a* applies monotonically increasing phase modulation to a light source r0, based on a phase modulation signal m0 (I, Q), and generates a transmission light signal p10 including a transmission light pulse having a frequency f0+foffset. The light intensity phase modulator 103 of the optical ranging pulse generation unit 120*b* performs monotonically decreasing phase modulation on the light source r0, based on the phase modulation signal m0 (I, Q), and generates a transmission light signal p11 including the transmission light pulse having the frequency f0−foffset.

The multiplexer 121 is a wavelength multiplexing unit that wavelength-multiplexes the transmission light pulse generated by the optical ranging pulse generation unit 120*a* and the optical ranging pulse generation unit 120*b*. The multiplexer 121 multiplexes the transmission light signal p10 including the transmission light pulse of the positive frequency offset, which is generated by the optical ranging pulse generation unit 120*a*, and the transmission light signal p11 including the transmission light pulse of the negative frequency offset, which is generated by the optical ranging pulse generation unit 120*b*, and generates a multiplexed signal p12.

The reception intensity detection unit 115 extracts only a signal of a predetermined level from the reception signal, based on a light intensity of an IQ reception signal m1 subjected to AD conversion. The reception intensity detection unit 115 detects a signal exceeding a predetermined threshold, similarly to the reception pulse detection unit 109 of the first and second example embodiments.

The BPFs 116*a* and 116*b* are band-pass filters for separating a signal of a positive frequency component and a signal of a negative frequency component which are wavelength-multiplexed. The BPF 116*a* extracts only a positive frequency component from the IQ reception signal m1 subjected to AD conversion, and generates a positive frequency signal m20 which is a signal of a positive frequency component (reception light pulse). The BPF 116*b* extracts only a negative frequency component from the IQ reception signal m1 subjected to AD conversion, and generates a negative frequency signal m21 which is a signal of a negative frequency component (reception light pulse).

The frequency detection units 117*a* and 117*b* detect the frequencies of the extracted positive and negative frequency signals. The frequency detection unit 117*a* detects the frequency of the positive frequency signal m20 (reception light pulse), based on a phase of the positive frequency signal m20. The frequency detection unit 117*b* detects the frequency of the negative frequency signal m21 (reception light pulse), based on a phase of the negative frequency signal m21.

Figure 24:
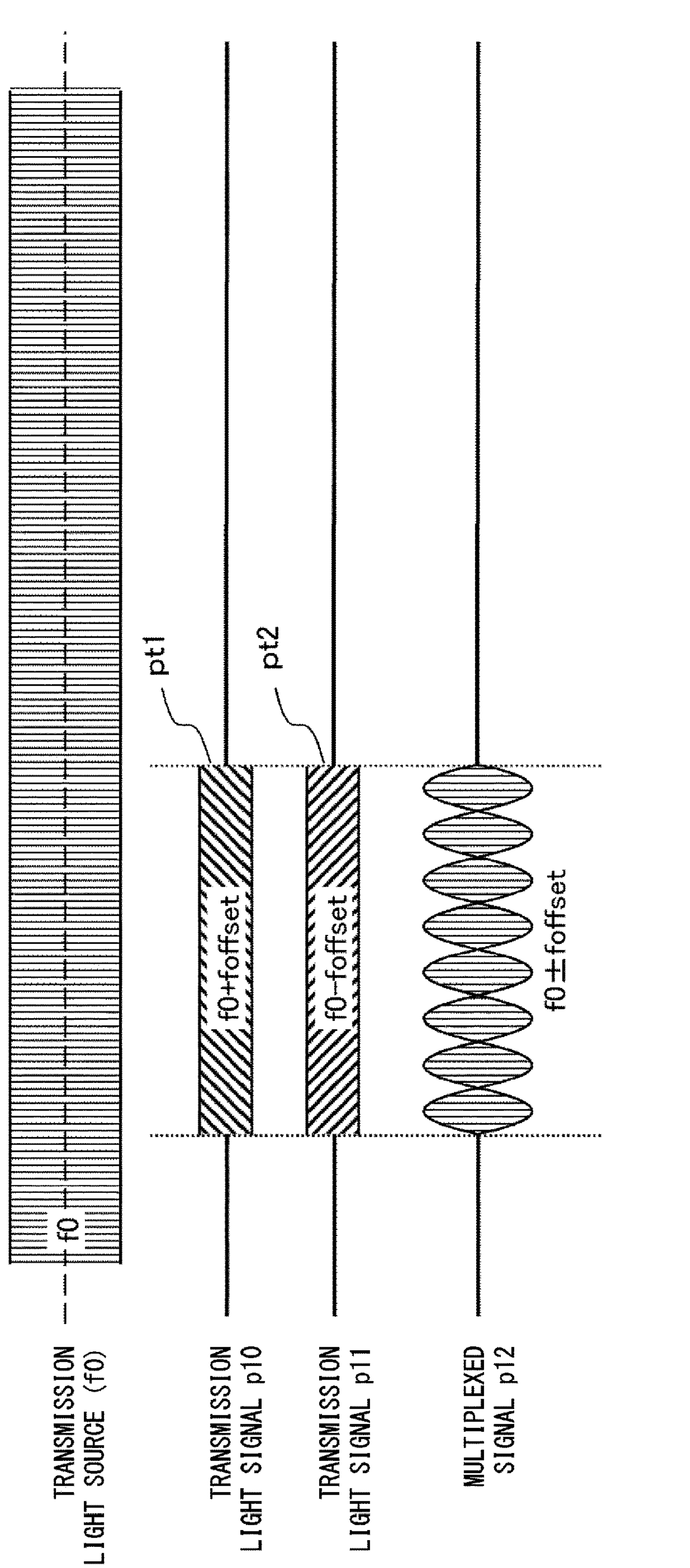
FIG. 24 is a timing chart illustrating a transmission signal according to the third example embodiment.

FIG. 24 illustrates a specific example of a signal on the transmission side in the optical measurement device 100 of FIG. 23. As illustrated in FIG. 24, the light source device 101 on the transmission side generates a light source r0 having an optical frequency f0, as in the first and second example embodiments. Similar to the region #1 of the transmission light pulse of the second example embodiment, the optical ranging pulse generation unit 120*a* generates a transmission light pulse pt1 having an optical frequency f0+foffset acquired by adding a frequency offset foffset to the frequency f0 of reference light. Similar to the region #2 of the transmission light pulse of the second example embodiment, the optical ranging pulse generation unit 120*b* generates a transmission light pulse pt2 having an optical frequency f0−foffset acquired by subtracting the frequency offset foffset from the frequency f0 of the reference light.

As illustrated in FIG. 24, when the multiplexer 121 multiplexes the transmission light pulse pt1 having a positive frequency offset and the transmission light pulse pt2 having a negative frequency offset, an amplitude-modulated multiplexed signal p12 is generated. As described above, when the optical signal having the optical frequency f0+foffset and the optical signal having the optical frequency f0−foffset are combined, an amplitude modulation signal of the optical frequency f0±foffset is acquired. This principle will be mathematically explained by using the following equations (5) to (8).

[Equation 5]

$$E = e^{j2\pi ft} = \cos(2\pi ft) + j\sin(2\pi ft) \tag{5}$$

$$E_+ = e^{j2\pi(+f_{offset})t} = \cos(2\pi(+f_{offset})t) + j\sin(2\pi(+f_{offset})t) \tag{6}$$

-continued $$E_- = e^{j2\pi(-f_{offset})t} = \cos(2\pi(-f_{offset})t) + j\sin(2\pi(-f_{offset})t) = \cos(2\pi(+f_{offset})t) - j\sin(2\pi(+f_{offset})t) \quad (7)$$

$$E_+ + E_- = 2\cos(2\pi(+f_{offset})t) \quad (8)$$

Equation (5) is acquired when the optical signal is represented by a complex sine wave, and therefore, the optical signal of +foffset and the optical signal of −foffset can be represented by Equations (6) and (7), respectively. From Equations (6) and (7), the optical signal of +foffset and the optical signal of −foffset are inverted in an imaginary part and are conjugated to each other. Therefore, when the optical signal of +foffset and the optical signal of −foffset are multiplexed, a signal of only the real part without the imaginary part is acquired as illustrated in Expression (8). Therefore, the multiplexed signal of the +foffset optical signal and the −foffset optical signal is a signal whose intensity (amplitude) is modulated.

Further, the above principle will be explained by using phase vector diagrams of FIGS. 25 to 27. The +foffset optical signal is a vector that rotates counterclockwise in the phase vector diagram, and the −foffset optical signal is a vector that rotates clockwise in the phase vector diagram. When the +foffset optical signal and the −foffset optical signal rotate diametrically opposite to each other on the phase vector diagram, the combined wave becomes a signal (a signal of only the real part) that only moves on a real axis (re). Therefore, the combined wave of the +foffset optical signal and the −foffset optical signal is a signal whose intensity (amplitude) is modulated.

Figure 25:
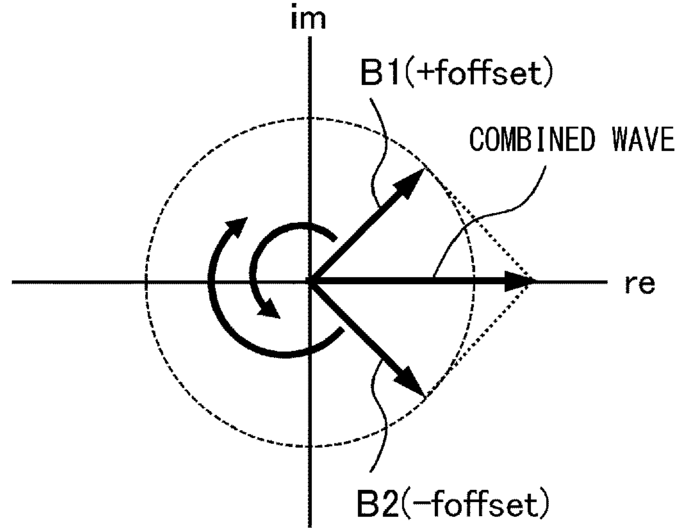
FIG. 25 is a diagram illustrating a phase vector of a transmission signal according to the third example embodiment.
Figure 26:
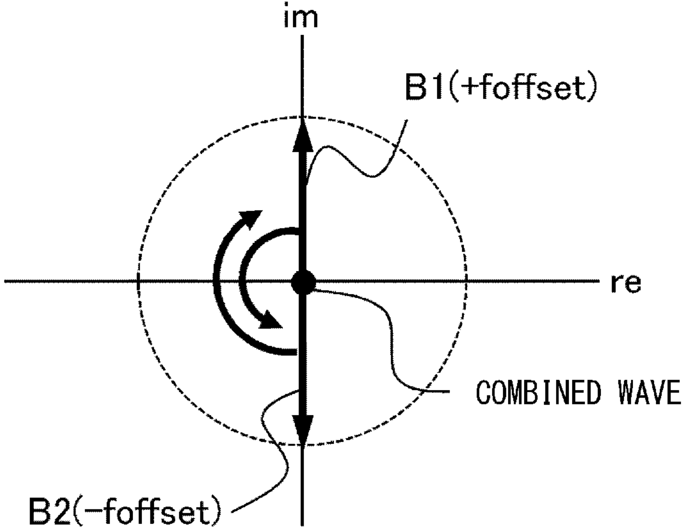
FIG. 26 is a diagram illustrating a phase vector of a transmission signal according to the third example embodiment.
Figure 27:
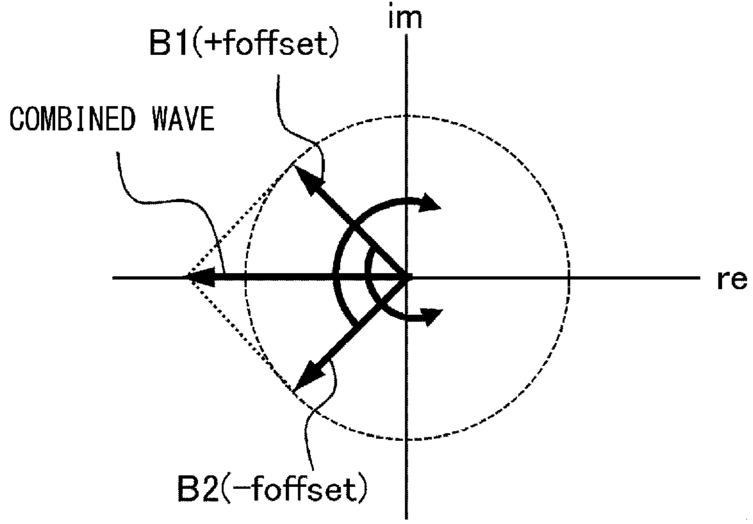
FIG. 27 is a diagram illustrating a phase vector of a transmission signal according to the third example embodiment.

For example, it is assumed that each signal rotates repeatedly as illustrated in FIGS. 25 to 27. In FIG. 25, a vector B1 of the optical signal of +foffset is positive in the real part and positive in the imaginary part, and a vector B2 of the optical signal of −foffset is positive in the real part and negative in the imaginary part. At this time, the vectors B1 and B2 are axisymmetric about the real axis, and the combined wave is a signal extending in a positive direction on the real axis. In FIG. 26, the vector B1 has a real part of 0 and an imaginary part of positive, and the vector B2 has a real part of 0 and an imaginary part of negative. Also in this case, since the vectors B1 and B2 are axisymmetric about the real axis, the combined wave becomes a signal of 0 on the real axis. In FIG. 27, the vector B1 is negative in the real part and positive in the imaginary part, and the vector B2 is negative in the real part and negative in the imaginary part. Also in this case, the vectors B1 and B2 are axisymmetric about the real axis, and the combined wave is a signal extending in a negative direction on the real axis.

Thus, the multiplexed signal p12 becomes an amplitude-modulated signal, and the amplitude-modulated signal is considered to be equivalent to a wavelength-multiplexing signal. For this reason, the transmission side of the optical measurement device may be composed of an optical amplitude modulator. The amplitude modulation signal can be expressed as follows: $E_c$ is a carrier signal, $E_{sig}$ is a modulation signal, and $E_{AM}$ is a signal generated by modulation.

[Equation 6]

$$E_c = \cos(2\pi f_0 t) \quad (9)$$

$$E_{sig} = \sin(2\pi f_{offset} t) \quad (10)$$

-continued $$E_{AM} = E_{sig}\sin(2\pi f_0 t) = \sin(2\pi f_{offset} t)\cos(2\pi f_0 t) = \frac{1}{2}\sin(2\pi(f_0 + f_{offset})t) + \frac{1}{2}\sin(2\pi(f_0 - f_{offset})t) \quad (11)$$

The modulated signal $E_{AM}$ acquired by modulating an amplitude of the carrier signal $E_c$ in Equation (9) with the modulation signal $E_{sig}$ in Equation Φ10) is expressed as in Equation (11). According to Equation (11), the amplitude modulation signal is composed of frequency components of the sum and difference of the carrier frequency and the modulation frequency. Therefore, the amplitude modulation signal can be said to be equivalent to the wavelength-multiplexing signal.

Figure 28:
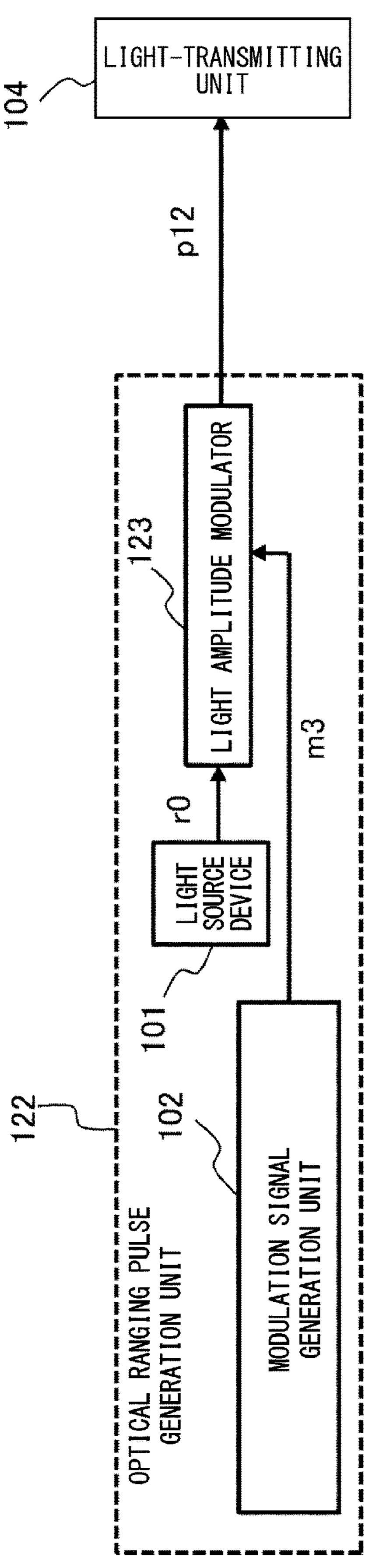
FIG. 28 is a configuration diagram illustrating a configuration example of a transmission side of the optical measurement device according to the third example embodiment.

FIG. 28 illustrates an example in which the transmission side of the optical measurement device is constituted of an optical amplitude modulator. As illustrated in FIG. 28, the transmission side of the optical measurement device may include an optical ranging pulse generation unit 122 using an optical amplitude modulator, instead of the optical ranging pulse generation units 120*a* and 120*b* and the multiplexer 121 in FIG. 23. As illustrated in FIG. 28, the optical ranging pulse generation unit 122 includes a light source device 101, a modulation signal generation unit 102, and an optical amplitude modulator 123. The modulation signal generation unit 102 generates an amplitude modulation signal m3 for providing amplitude modulation of a frequency offset (±foffset). The optical amplitude modulator 123 generates an amplitude modulation optical signal (multiplexed signal p12) acquired by applying amplitude modulation to the light source r0, based on the amplitude modulation signal m3. The optical amplitude modulator 123 is, for example, an MZ type optical modulator. With the configuration as illustrated in FIG. 28, the transmission side of the optical measurement device can be simplified.

Figure 29:
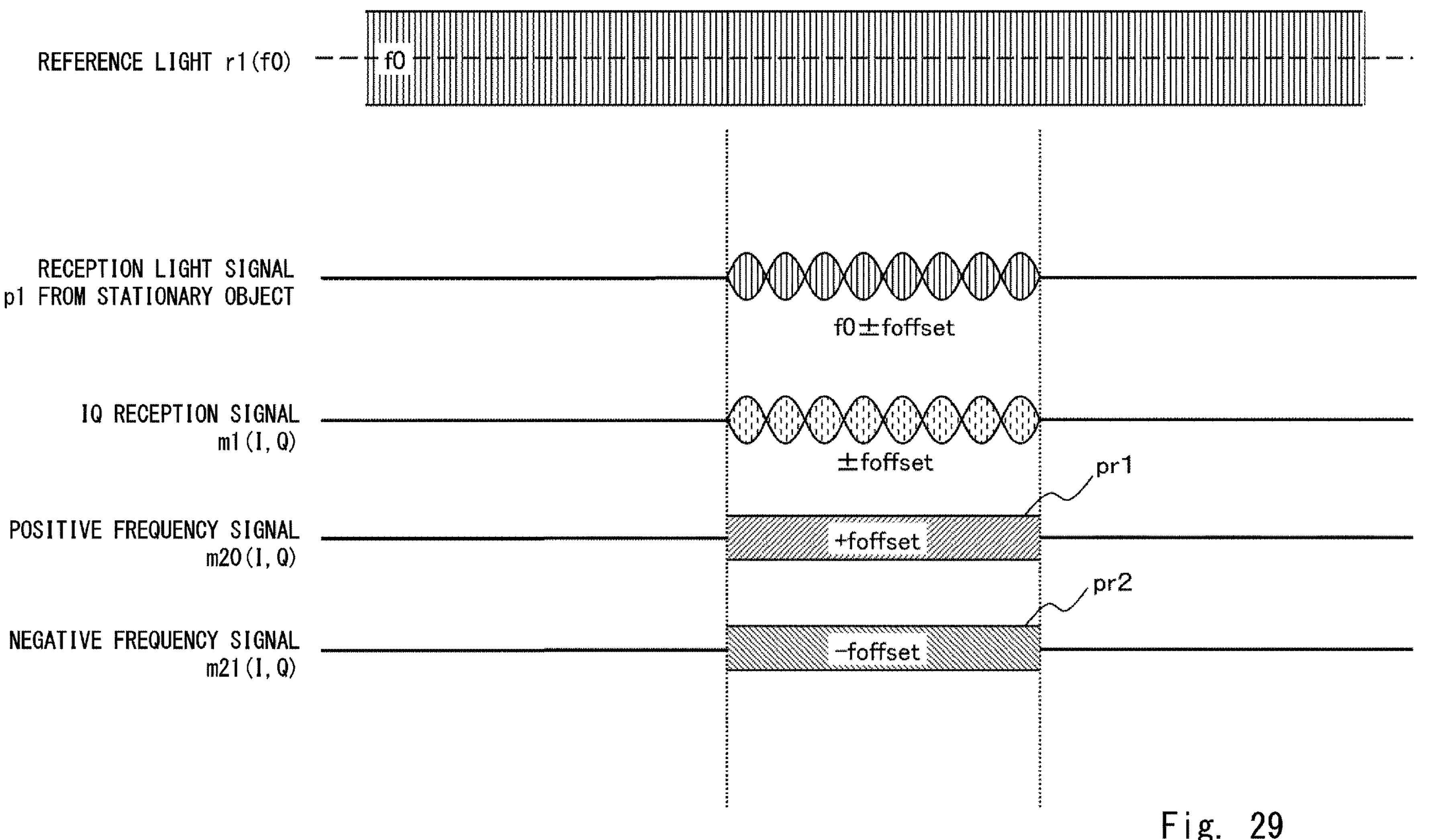
FIG. 29 is a timing chart illustrating a reception signal according to the third example embodiment.
Figure 30:
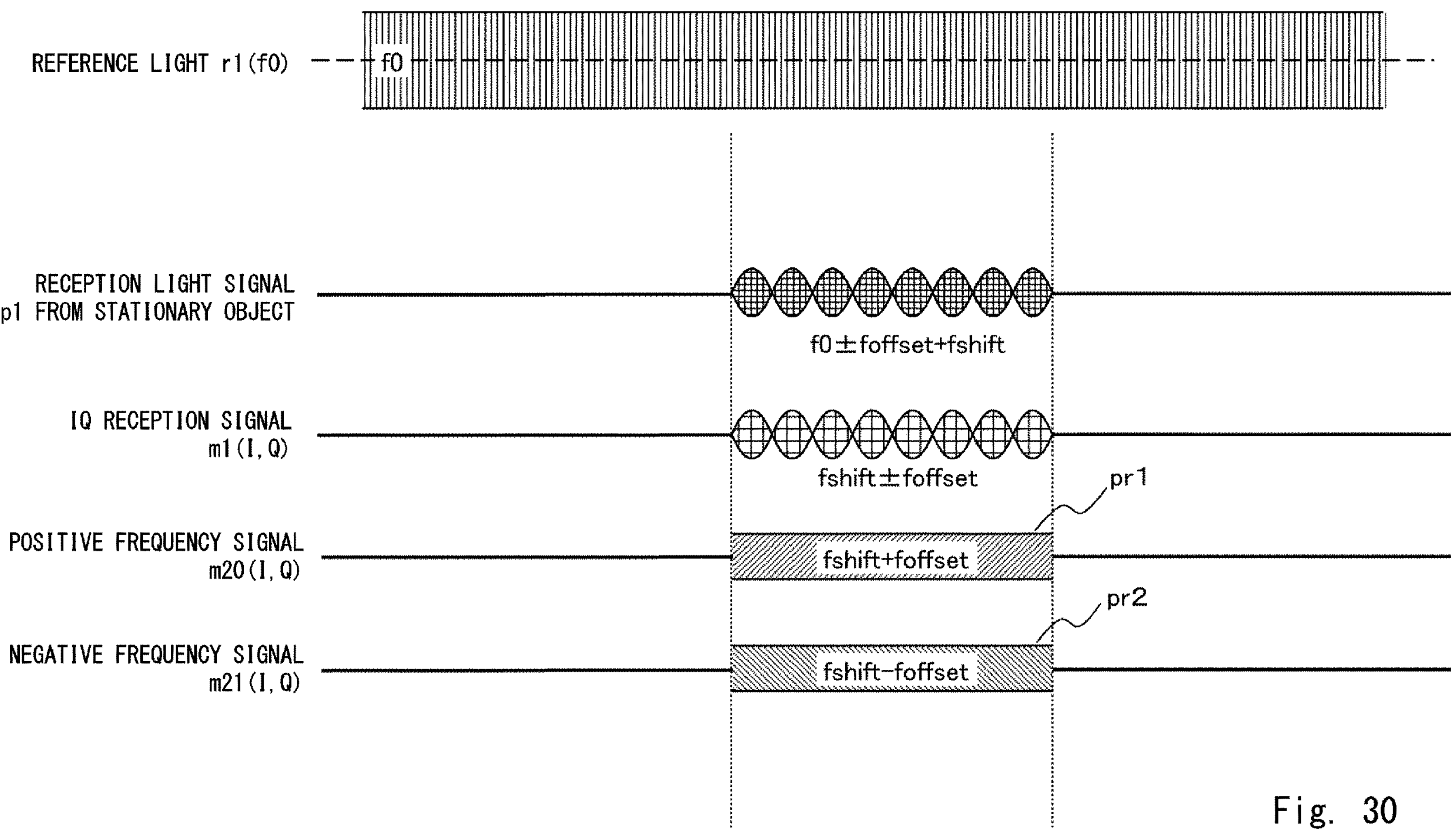
FIG. 30 is a timing chart illustrating a reception signal according to the third example embodiment.
Figure 31:
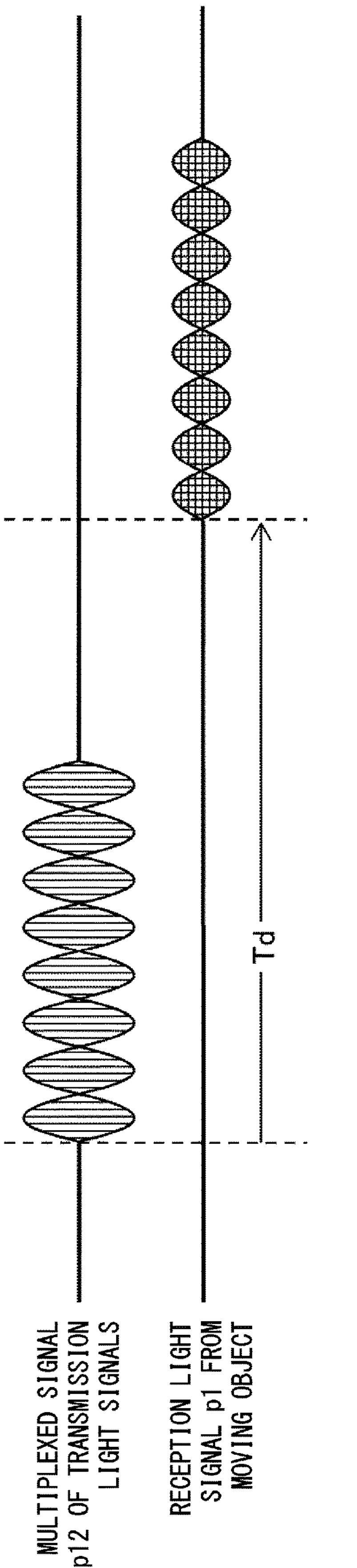
FIG. 31 is a timing chart illustrating an example of an optical ranging method according to the third example embodiment.
Figure 32:
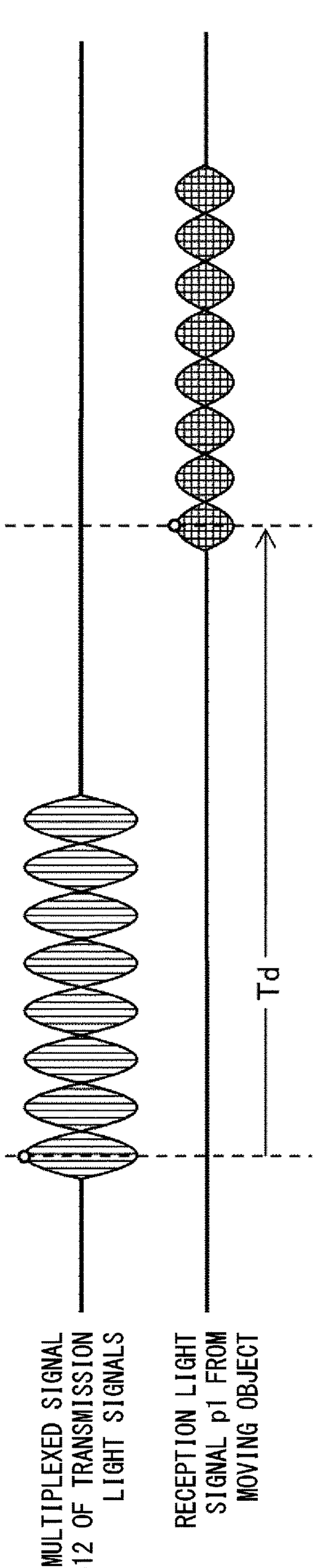
FIG. 32 is a timing chart illustrating an example of the optical ranging method according to the third example embodiment.
Figure 33:
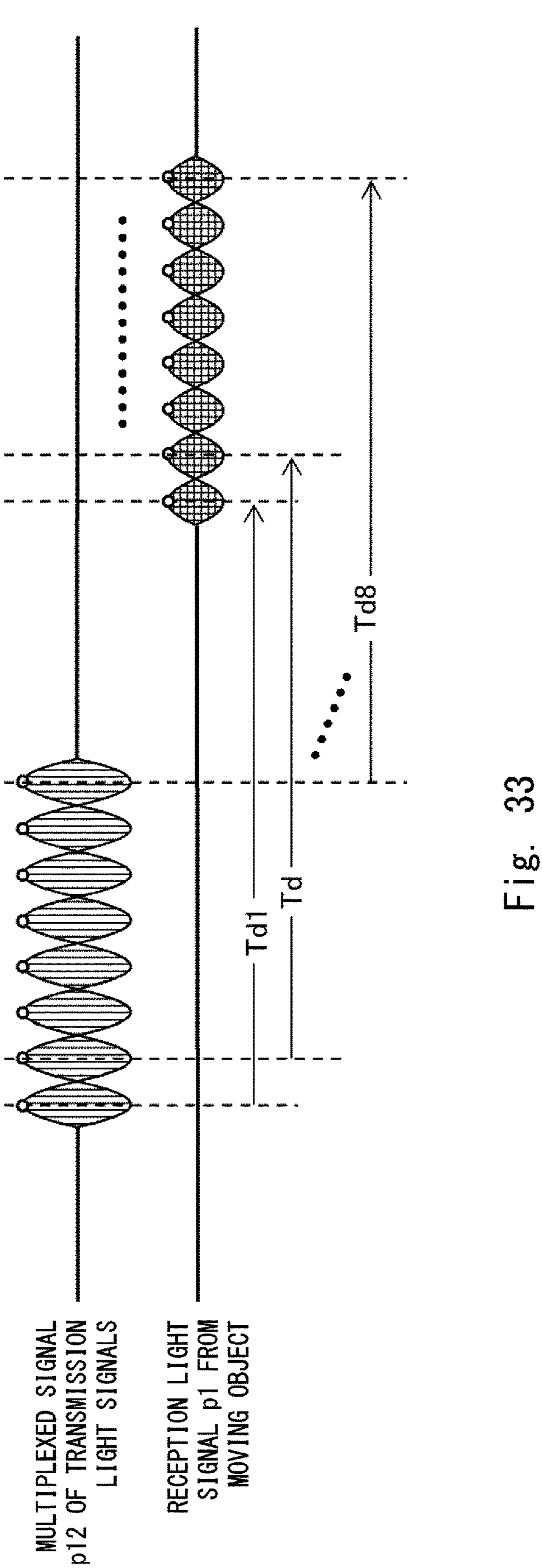
FIG. 33 is a timing chart illustrating an example of the optical ranging method according to the third example embodiment.

FIGS. 29 and 30 illustrate specific examples of signals on the reception side in the optical measurement device 100 of FIG. 23. FIG. 29 is an example of a reception signal when the measurement object is a stationary object, and FIG. 30 is an example of a reception signal when the measurement object is a moving object. FIGS. 31 to 33 illustrate examples of the ToF ranging method in the signals of FIGS. 29 and 30.

As illustrated in FIGS. 29 and 30, as in the first and second example embodiments, the light source device 106 on the reception side generates the reference light r1 having the same optical frequency f0 as that on the transmission side.

In the example of FIG. 29, since the measurement object is stationary, the light-receiving unit 105 receives a reception light signal p1 having the same wavelength-multiplexed optical frequency f0±foffset as the transmission signal from the measurement object. Also in the present example embodiment, as in the first and second example embodiments, the same signal as that of the transmission side is demodulated on the reception side, based on the principle of the coherent IQ optical receiver used in digital coherent optical communication. Then, as illustrated in FIG. 29, the IQ reception signal m1 (I, Q) being output from the coherent IQ optical receiver 107 becomes a signal of a frequency ±foffset acquired by wavelength-multiplexing the modulation signal m0 of the optical ranging pulse generation units 120*a* and 120*b* on the transmission side.

The reception intensity detection unit 115 detects a signal intensity of the IQ reception signal, and the reception time extraction unit 110 extracts a reception time, based on the signal intensity of the detected IQ reception signal.

For example, as illustrated in FIG. 31, the distance calculation unit 111 calculates the distance of the measurement object, based on a return delay time Td from the start of transmission of the multiplexed signal p12 (transmission light signal) to the reception of the reception light signal p1. In this case, the modulation signal generation unit 102 of the optical ranging pulse generation units 120*a* and 120*b* generates a transmission trigger signal Tr at the timing of modulation (start of transmission), and the reception time extraction unit 110 extracts a reception start time of the IQ reception signal m1 acquired by demodulating the reception light signal p1 as the reception time.

In the present example embodiment, the transmission light signal and the reception light signal are amplitude modulation signals and are not pulse-shaped signals. Therefore, a timing of measuring the distance is not limited to FIG. 31. For example, as illustrated in FIG. 32, the distance of the measurement object may be acquired based on the return delay time Td from a time of a head peak (first peak point) of amplitude modulation of the multiplexed signal p12 to a time of a head peak of amplitude modulation of the reception light signal p1. In this case, for example, the multiplexer 121 generates the transmission trigger signal Tr at the timing of the head peak of the multiplexed signal p12, and the reception time extraction unit 110 extracts a time of a head peak of the IQ reception signal m1 acquired by demodulating the reception light signal p1 as the reception time.

Further, as illustrated in FIG. 33, the distance of the measurement object may be acquired by using each of the return delay times Td (e.g., Td1 to Td8) between times of a plurality of peaks (e.g., all the peaks) of amplitude modulation of the multiplexed signal p12 and times of a plurality of peaks of amplitude modulation of the reception light signal p1. For example, the distance is acquired from the average value of the return delay times Td1 to Td8. In this case, for example, the multiplexer 121 generates the transmission trigger signal Tr at the timing of the plurality of peaks of the multiplexed signal p12, and the reception time extraction unit 110 extracts the time of each of a plurality of peaks of the IQ reception signal m1 acquired by demodulating the reception light signal p1 as the reception time. By measuring the distance using a plurality of peak times, ranging accuracy can be improved.

In the example of FIG. 29, the positive frequency signal m20 is extracted from the IQ reception signal m1 of the frequency ±foffset via the BPF 116*a*, and the negative frequency signal m21 is extracted via the BPF 116*b*. The positive frequency signal m20 includes the reception light pulse pr1 of the frequency +foffset, and the negative frequency signal m21 includes the reception light pulse pr2 of the frequency −foffset.

On the other hand, in the example of FIG. 30, since the measurement object is moving, the light-receiving unit 105 receives the reception light signal p1 of the optical frequency f0±foffset+fshift acquired by Doppler-shifting the wavelength-multiplexed signal, which is a transmission signal, from the measurement object. Then, the IQ reception signal m1 (I, Q) becomes a signal of frequency fshift±foffset, the frequency of the positive frequency signal m20 (reception light pulse pr1) via the BPF 116*a* becomes fshift+foffset, and the frequency of the negative frequency signal m21 (reception light pulse pr2) via the BPF 116*b* becomes fshift-foffset. The frequencies of the positive frequency signal m20 and the negative frequency signal m21 are the same as the regions #1 and #2 of the reception light pulse of the second example embodiment, respectively. Therefore, according to the same principle as in the second example embodiment, the Doppler shift amount calculation unit 113 acquires a Doppler shift amount by adding the frequency of the positive frequency signal m20 and the frequency of the negative frequency signal m21 and dividing by 2. The Doppler shift amount may be acquired from the inclination of the phase as in the second example embodiment, or may be acquired from the detected frequency.

As described above, in the present example embodiment, the light pulse of the positive frequency offset and the light pulse of the negative frequency offset are wavelength-multiplexed and transmitted, and the Doppler shift amount is calculated from the frequency of the signal of each frequency component included in the reception light signal in the same manner as in the second example embodiment. As a result, as in the second example embodiment, the Doppler shift amount can be accurately acquired without depending on the variation of the frequency offset due to imperfections such as the characteristics of the optical ranging pulse generation unit. In addition, since a signal with a positive frequency offset and a signal with a negative frequency offset can be transmitted and received with a pulse width twice that of the second example embodiment, detection accuracy of the frequency (phase) can be improved.

Note that the present disclosure is not limited to the above-mentioned example embodiments, and can be modified as appropriate within a range not deviating from the gist. For example, in the above example embodiments, an example of time division multiplexing or wavelength-multiplexing optical signals of two frequencies (phase inclinations) has been explained, but the present disclosure is not limited to this, and further, optical signals of a plurality of frequencies may be time division multiplexed or wavelength-multiplexed.

Although the present disclosure has been explained above with reference to the example embodiments, the present disclosure is not limited to the above example embodiments. Various modifications may be made to the structure and details of the present disclosure as will be understood by those skilled in the art within the scope of the present disclosure.

Some or all of the above example embodiments may also be described as the following supplementary notes, but are not limited to the following.

(Supplementary Note 1)

An optical measurement device comprising:

light-transmitting means for transmitting ranging light for Time of Flight (ToF) ranging;

light-receiving means for receiving reflection light that is reflected from a measurement object by the transmitted ranging light;

Doppler shift amount calculation means for calculating a Doppler shift amount of a frequency of the reflection light, based on a phase change amount of the received reflection light; and relative speed calculation means for calculating a relative speed of the measurement object, based on the calculated Doppler shift amount.

(Supplementary Note 2)

The optical measurement device according to Supplementary Note 1, wherein the Doppler shift amount calculation means calculates the Doppler shift amount, based on a difference between a phase change amount of reflection light when there is no Doppler shift and a phase change amount of the received reflection light.

(Supplementary Note 3)

The optical measurement device according to Supplementary Note 1 or 2, wherein the ranging light to be transmitted has a frequency component of a predetermined frequency offset with respect to a frequency of a reference light source.

(Supplementary Note 4)

The optical measurement device according to Supplementary Note 3, wherein the ranging light to be transmitted has a frequency component of a first frequency offset being an offset in a positive direction with respect to a frequency of the reference light source, and a frequency component of a second frequency offset being an offset in a negative direction with respect to a frequency of the reference light source.

(Supplementary Note 5)

The optical measurement device according to Supplementary Note 4, wherein the Doppler shift amount calculation means calculates the Doppler shift amount, based on a phase change amount of the frequency component in the positive direction included in the reflection light and a phase change amount of the frequency component in the negative direction included in the reflection light.

(Supplementary Note 6)

The optical measurement device according to Supplementary Note 5, wherein the Doppler shift amount calculation means calculates the Doppler shift amount, based on a value acquired by adding a phase change amount of the frequency component in the positive direction and a phase change amount of the frequency component in the negative direction and dividing by 2.

(Supplementary Note 7)

The optical measurement device according to any one of Supplementary Notes 4 to 6, further comprising light pulse generation means for generating a light pulse having a phase change point between a first phase modulation portion of the first frequency offset and a second phase modulation portion of the second frequency offset, wherein the light-transmitting means transmits the ranging light including the generated light pulse.

(Supplementary Note 8)

The optical measurement device according to Supplementary Note 7, further comprising distance calculation means for calculating a distance to the measurement object, based on a phase change point of a light pulse included in the transmitted ranging light and a phase change point of a light pulse included in the received reflection light.

(Supplementary Note 9)

The optical measurement device according to any one of Supplementary Notes 4 to 6, wherein the light-transmitting means transmits a wavelength-multiplexing signal acquired by wavelength-multiplexing a frequency component of the first frequency offset and a frequency component of the second frequency offset as the ranging light.

(Supplementary Note 10)

The optical measurement device according to Supplementary Note 9, further comprising:

light pulse generation means for generating a first light pulse having a frequency component of the first frequency offset and a second light pulse having a frequency component of the second frequency offset; and wavelength multiplexing means for wavelength-multiplexing the generated first and second light pulses, wherein the light-transmitting means transmits the ranging light including the wavelength-multiplexed first and second light pulses.

(Supplementary Note 11)

The optical measurement device according to Supplementary Note 9, further comprising amplitude modulation means for generating an amplitude modulation signal having a frequency component of the first frequency offset and a frequency component of the second frequency offset, wherein the light-transmitting means transmits the generated amplitude modulation signal as the ranging light.

(Supplementary Note 12)

The optical measurement device according to any one of Supplementary Notes 9 to 11, further comprising distance calculation means for calculating a distance to the measurement object, based on a first peak point of the transmitted ranging light and the first peak point of the received reflection light.

(Supplementary Note 13)

The optical measurement device according to Supplementary Note 12, wherein the distance calculation means calculates the distance, based on a plurality of peak points of the transmitted ranging light and the plurality of peak points of the received reflection light.

(Supplementary Note 14)

The optical measurement device according to Supplementary Note 13, wherein the distance calculation means calculates the distance, based on an average of time differences between a plurality of peak points of the transmitted ranging light and the plurality of peak points of the received reflection light.

(Supplementary Note 15)

An optical measurement method comprising:

transmitting ranging light for Time of Flight (ToF) ranging;

receiving reflection light that is reflected from a measurement object by the transmitted ranging light;

calculating a Doppler shift amount of a frequency of the reflection light, based on a phase change amount of the received reflection light; and calculating a relative speed of the measurement object, based on the calculated Doppler shift amount.

(Supplementary Note 16)

The optical measurement method according to Supplementary Note 15, wherein the calculating the Doppler shift amount includes calculating the Doppler shift amount, based on a difference between a phase change amount of reflection light when there is no Doppler shift and a phase change amount of the received reflection light.

REFERENCE SIGNS LIST

10 OPTICAL MEASUREMENT DEVICE
11 LIGHT-TRANSMITTING UNIT
12 LIGHT-RECEIVING UNIT
13 DOPPLER SHIFT AMOUNT CALCULATION UNIT
14 RELATIVE SPEED CALCULATION UNIT
15 DISTANCE CALCULATION UNIT
100 OPTICAL MEASUREMENT DEVICE
101 LIGHT SOURCE DEVICE
102 MODULATION SIGNAL GENERATION UNIT
103 LIGHT INTENSITY PHASE MODULATOR
104 LIGHT-TRANSMITTING UNIT
105 LIGHT-RECEIVING UNIT
106 LIGHT SOURCE DEVICE
107 COHERENT IQ OPTICAL RECEIVER
**107*a*** LIGHT INTERFERENCE SYSTEM
**107*b*** OPTICAL/ELECTRICAL CONVERTER
108 ADC
109 RECEPTION PULSE DETECTION UNIT
110 RECEPTION TIME EXTRACTION UNIT
111 DISTANCE CALCULATION UNIT
112 PHASE DETECTION UNIT

113 DOPPLER SHIFT AMOUNT CALCULATION UNIT
114 RELATIVE SPEED CALCULATION UNIT
115 RECEPTION INTENSITY DETECTION UNIT
**116*a*, 116*b*** BPF
**117*a*, 117*b*** FREQUENCY DETECTION UNIT
**120, 120*a*, 120*b*, 122** OPTICAL RANGING PULSE GENERATION UNIT
121 MULTIPLEXER
123 OPTICAL AMPLITUDE MODULATOR
130 LIGHT TRANSMISSION/RECEPTION BLOCK
**200*a*, 200*b*** OPTICAL MODULATION UNIT
201 INPUT OPTICAL WAVEGUIDE
**201*a*, 201*b* PHASE MODULATION ELECTRODES2**
202, 203 ARM
204 OUTPUT OPTICAL WAVEGUIDE

What is claimed is:

1. An optical measurement device comprising:

a light-transmitter configured to transmit ranging light for Time of Flight (ToF) ranging;

a light-receiver configured to receive reflection light that is reflected from a measurement object by the transmitted ranging light;

a Doppler shift amount calculator configured to calculate a Doppler shift amount of a frequency of the reflection light, based on a phase change amount of the received reflection light; and a relative speed calculator configured to calculate a relative speed of the measurement object, based on the calculated Doppler shift amount, wherein the ranging light to be transmitted has a frequency component of a first frequency offset being an offset in a positive direction with respect to a frequency of a reference light source, and a frequency component of a second frequency offset being an offset in a negative direction with respect to the frequency of the reference light source, and the Doppler shift amount calculator calculates the Doppler shift amount, based on a value acquired by adding a phase change amount of the frequency component in the positive direction included in the reflection light and a phase change amount of the frequency component in the negative direction included in the reflection light and dividing by 2.

2. The optical measurement device according to claim 1, wherein the Doppler shift amount calculator calculates the Doppler shift amount, based on a difference between a phase change amount of reflection light when there is no Doppler shift and a phase change amount of the received reflection light.

3. The optical measurement device according to claim 1, further comprising a light pulse generator configured to generate a light pulse having a phase change point between a first phase modulation portion of the first frequency offset and a second phase modulation portion of the second frequency offset, wherein the light-transmitter transmits the ranging light including the generated light pulse.

4. The optical measurement device according to claim 3, further comprising a distance calculator configured to calculate a distance to the measurement object, based on a phase change point of a light pulse included in the transmitted ranging light and a phase change point of a light pulse included in the received reflection light.

5. The optical measurement device according to claim 1, wherein the light-transmitter transmits a wavelength-multiplexing signal acquired by wavelength-multiplexing the frequency component of the first frequency offset and the frequency component of the second frequency offset as the ranging light.

6. The optical measurement device according to claim 5, further comprising:

a light pulse generator configured to generate a first light pulse having the frequency component of the first frequency offset and a second light pulse having the frequency component of the second frequency offset; and a wavelength multiplexer configured to wavelength-multiplex the generated first and second light pulses, wherein the light-transmitter transmits the ranging light including the wavelength-multiplexed first and second light pulses.

7. The optical measurement device according to claim 5, further comprising an amplitude modulator configured to generate an amplitude modulation signal having a frequency component of the first frequency offset and a frequency component of the second frequency offset, wherein the light-transmitter transmits the generated amplitude modulation signal as the ranging light.

8. The optical measurement device according to claim 5, further comprising a distance calculator configured to calculate a distance to the measurement object, based on a first peak point of the transmitted ranging light and the first peak point of the received reflection light.

9. The optical measurement device according to claim 8, wherein the distance calculator calculates the distance, based on a plurality of peak points of the transmitted ranging light and the plurality of peak points of the received reflection light.

10. The optical measurement device according to claim 9, wherein the distance calculator calculates the distance, based on an average of time differences between a plurality of peak points of the transmitted ranging light and the plurality of peak points of the received reflection light.

11. An optical measurement method comprising:

transmitting ranging light for Time of Flight (ToF) ranging;

receiving reflection light that is reflected from a measurement object by the transmitted ranging light;

calculating a Doppler shift amount of a frequency of the reflection light, based on a phase change amount of the received reflection light; and calculating a relative speed of the measurement object, based on the calculated Doppler shift amount, wherein the ranging light to be transmitted has a frequency component of a first frequency offset being an offset in a positive direction with respect to a frequency of a reference light source, and a frequency component of a second frequency offset being an offset in a negative direction with respect to the frequency of the reference light source, and the calculating of the Doppler shift amount includes calculating the Doppler shift amount, based on a value acquired by adding a phase change amount of the frequency component in the positive direction included in the reflection light and a phase change amount of the frequency component in the negative direction included in the reflection light and dividing by 2.

12. The optical measurement method according to claim 11, wherein the calculating the Doppler shift amount includes calculating the Doppler shift amount, based on a difference between a phase change amount of reflection light when there is no Doppler shift and a phase change amount of the received reflection light.

* * * * *